US012600858B2

(12) United States Patent
Koenig et al.

(10) Patent No.: US 12,600,858 B2
(45) Date of Patent: Apr. 14, 2026

(54) ION SELECTIVE MEMBRANES FOR ORGANIC ELECTROCHEMICAL PROCESSES

(71) Applicant: University of Virginia Patent Foundation, Charlottesville, VA (US)

(72) Inventors: Gary M. Koenig, Charlottesville, VA (US); Geoffrey M. Geise, Charlottesville, VA (US); Patrick M. McCormack, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 841 days.

(21) Appl. No.: 17/907,773

(22) PCT Filed: Mar. 19, 2021

(86) PCT No.: PCT/US2021/023280

§ 371 (c)(1),
(2) Date: Aug. 29, 2022

(87) PCT Pub. No.: WO2021/188977

PCT Pub. Date: Sep. 23, 2021

(65) Prior Publication Data

US 2023/0099030 A1 Mar. 30, 2023

Related U.S. Application Data

(60) Provisional application No. 62/991,690, filed on Mar. 19, 2020.

(51) Int. Cl.
*C08L 71/12* (2006.01)
*B01J 41/13* (2017.01)
(Continued)

(52) U.S. Cl.
CPC ............. *C08L 71/126* (2013.01); *B01J 41/13* (2017.01); *C08G 65/485* (2013.01); *C25B 13/08* (2013.01);
(Continued)

(58) Field of Classification Search
CPC ................. H01M 8/103; H01M 8/188; H01M 2008/1095; H01M 50/423; C08L 71/126
See application file for complete search history.

(56) References Cited

U.S. PATENT DOCUMENTS 5,028,337 A 7/1991 Linder et al.
2011/0207028 A1 8/2011 Fukuta et al.
(Continued)

OTHER PUBLICATIONS

Notification of Transmittal of the International Search Report and the Written Opinion of the International Searching Authority, or the Declaration for International Application No. PCT/US21/23280 (Jun. 9, 2021).
"Cross-Link," Wikipedia, pp. 1-7 (May 26, 2021).
"Polyether ether ketone," Wikipedia, pp. 1-4 (May 26, 2021).
Basma et al., "The liquid structure of the solvents dimethylformamide (DMF) and dimethylacetamide (DMA)," Molecular Physics, vol. 117, No. 22, pp. 1-12 (2019).
(Continued)

*Primary Examiner* — Christopher P Domone
(74) *Attorney, Agent, or Firm* — Jenkins, Taylor & Hunt, P.A.

(57) ABSTRACT

An ion conducting polymer comprising a modified poly (phenylene oxide) is described. In an exemplary modified polymer, a portion of the monomeric units are attached to a sulfonate-substituted arylamino moiety, such as a monovalent derivative of phenoxy aniline trisulfonate (BOATS), to form a monomeric unit with a charged side chain. Ion conducting polymers can also be prepared with polyether-containing side chains. The ion conducting polymer can be used to prepare ion exchange membranes which can be used in a variety of applications, such as in non-aqueous redox flow batteries and related energy storage systems.

27 Claims, 9 Drawing Sheets

(51) Int. Cl.

| | |
|---|---|
| ***C08G 65/48*** | (2006.01) |
| ***C25B 13/08*** | (2006.01) |
| ***H01M 8/04082*** | (2016.01) |
| ***H01M 8/04186*** | (2016.01) |
| ***H01M 8/103*** | (2016.01) |
| ***H01M 8/18*** | (2006.01) |
| ***H01M 50/423*** | (2021.01) |
| *H01M 4/02* | (2006.01) |
| *H01M 8/10* | (2016.01) |

(52) U.S. Cl.

CPC ... *H01M 8/04186* (2013.01); *H01M 8/04201* (2013.01); *H01M 8/103* (2013.01); *H01M 8/188* (2013.01); *H01M 50/423* (2021.01); *H01M 2004/027* (2013.01); *H01M 2004/028* (2013.01); *H01M 2008/1095* (2013.01); *H01M 2220/10* (2013.01)

(56) References Cited

U.S. PATENT DOCUMENTS

| | | | | |
|---|---|---|---|---|
| 2012/0178834 | A1 | 7/2012 | Linder et al. | |
| 2017/0014772 | A1* | 1/2017 | Linder | B01D 69/1214 |
| 2023/0275251 | A1* | 8/2023 | Narayan | C07C 309/32<br>429/499 |

OTHER PUBLICATIONS

"Initiation by Diacyl Peroxides," Polymer Chemistry, Wayback Machine, https://polymerdatabase.com/polymerchemistry/diacylperoxides.html, pp. 1-2 (Mar. 10, 2019).

Shawcross et al., "Observations on the Vilsmeier Reaction Part 2. The Anomalous Reaction of N-Benzyl N-Cyanoethyl-4-Methylaniline Derivatives," Tetrahedron, vol. 45, No. 22, pp. 1-15 (1989).

* cited by examiner

ION SELECTIVE MEMBRANES FOR ORGANIC ELECTROCHEMICAL PROCESSES

CROSS REFERENCE TO RELATED APPLICATIONS

This application claims benefit of U.S. Provisional Application Ser. No. 62/991,690 filed on Mar. 19, 2020, the disclosure of which is incorporated herein by reference in its entirety.

STATEMENT OF GOVERNMENT INTEREST

This invention was made with government support under Grant No. 1752048, awarded by the National Science Foundation. The government has certain rights in the invention.

TECHNICAL FIELD

The presently disclosed subject matter relates to an ion selective polymer comprising a modified poly(phenylene oxide), as well as to membranes of the ion selective polymer and batteries, such as non-aqueous electrolyte flow batteries and other devices comprising the membranes. The presently disclosed subject matter further relates to methods of preparing the ion selective polymer and related membranes.

BACKGROUND

As energy consumption based on fossil fuels increases worldwide, interest has increased in secure sustainable energy sources such as sunlight, wind power, tidal power, biomass, and the like, in order to replace fossil fuels. To this end, many efforts have been actively made to develop a technology for producing and storing new forms of renewable energy. Among these forms, redox flow batteries have drawn considerable attention as environment-friendly medium or large energy storage devices.

A redox flow battery (RFB) is a type of electrochemical cell that stores electrical energy as chemical energy through oxidation and reduction of redox active components in an electrolyte. One advantage of RFBs is that their energy storage capacity can be reduced or enlarged through size adjustment of the external electrolyte storage tanks. Electrolyte can be stored outside the electrochemical cell in external electrolyte storage tanks and flowed (e.g., pumped through) a battery cell comprising electrodes on separate sides of an ion exchange membrane (IEM) to generate energy. Suitable IEMs are those that have high ion selectively so that they can allow for fast transport of a charge carrier (e.g., a lithium or sodium cation) through the membrane, while inhibiting transport of the redox active components (e.g., to prevent self-discharge of the RFB).

According to solvent type, redox flow batteries can be broadly classified into aqueous redox flow batteries using water and non-aqueous (or organic electrolyte) redox flow batteries using an organic solvent. To date, most studies on RFBs focus on aqueous redox flow batteries and thus, most development of IEMs has related to membranes that are compatible with aqueous electrolytes.

Accordingly, there is an ongoing need for additional ion selective membranes, particularly those for organic electrolyte redox flow batteries.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this summary does not list or suggest all possible combinations of such features.

In some embodiments, the presently disclosed subject matter provides an ion conducting polymer comprising a modified poly(phenylene oxide) (PPO), wherein the modified PPO comprises a PPO wherein a portion of monomeric units of the PPO are covalently attached to a sulfonate-substituted arylamino group. In some embodiments, the sulfonate-substituted arylamino group is a monovalent moiety of a sulfonate-substituted phenoxyaniline, optionally phenoxyaniline trisulfonate (POATS).

In some embodiments, up to about 50% of the monomeric units of the PPO are covalently attached to a sulfonate-substituted arylamino group; optionally wherein about 2% to about 30% of the monomeric units of the PPO are covalently attached to a sulfonated-substituted arylamino group. In some embodiments, the modified PPO has a structure of Formula (I) or Formula (II):

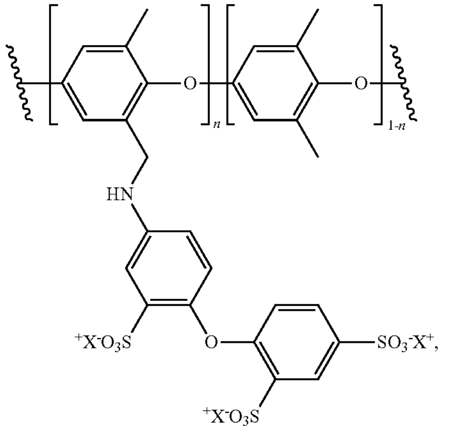

or

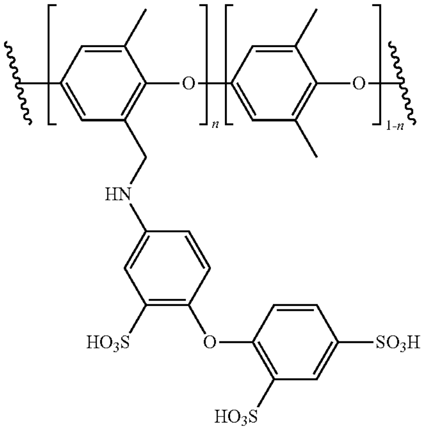

wherein: $0.025 \leq n \leq 0.091$; optionally wherein $0.046 \leq n \leq 0.091$; and $X^+$ is a cation, optionally an ammonium cation or an alkali metal cation; further optionally $Li^+$. In some embodiments, n is selected from 0.0046, 0.0063, 0.0072, and 0.0091.

In some embodiments, a portion of the monomeric units of the PPO are covalently attached to a side chain comprising an oligomeric polyether, optionally an oligomeric poly (ethylene glycol).

In some embodiments, the presently disclosed subject matter provides a polymer blend comprising two or more polymers, wherein one of the two or more polymers is an ion conducting polymer comprising a modified PPO, wherein the modified PPO comprises a PPO wherein a portion of monomeric units of the PPO are covalently attached to a sulfonate-substituted arylamino group, optionally wherein the mixture comprises at least one polyether-modified PPO, wherein the polyether-modified PPO comprises a PPO wherein a portion of monomeric units of the PPO are covalently attached to a side chain comprising an oligomeric polyether.

In some embodiments, the presently disclosed subject matter provides an ion exchange membrane (IEM) comprising, consisting essentially of, or consisting of an ion conducting polymer comprising a modified PPO, wherein the modified PPO comprises a PPO wherein a portion of monomeric units of the PPO are covalently attached to a sulfonate-substituted arylamino group, or a blend comprising the modified PPO. In some embodiments, the ion conducting polymer is crosslinked. In some embodiments, the IEM has a thickness of about 10 nanometers (nm) to about 100 micrometers (μm), optionally about 40 μm to about 100 μm. In some embodiments, the presently disclosed subject matter provides a battery, fuel cell, or separation device comprising the IEM.

In some embodiments, the presently disclosed subject matter provides a battery comprising the IEM, wherein the battery is an aqueous or non-aqueous redox flow battery and wherein the battery comprises, in addition to the IEM: a positive electrode; a positive electrolyte comprising a first redox active composition, wherein said positive electrolyte is in contact with the positive electrode; a negative electrode; and a negative electrolyte comprising a second redox active composition, wherein said negative electrode is in contact with the negative electrode, and wherein the IEM is interposed between the positive electrode and the negative electrode. In some embodiments, the battery further comprises: a first circulation loop comprising a positive electrolyte storage tank containing the positive electrolyte, piping for transporting the positive electrolyte, a chamber in which the positive electrode is in contact with the positive electrolyte, and a pump to circulate the positive electrolyte through the first circulation loop; and a second circulation loop comprising a negative electrolyte storage tank containing the negative electrolyte, piping for transporting the negative electrolyte, a chamber in which the negative electrode is in contact with the negative electrolyte, and a pump to circulate the negative electrolyte through the circulation loop. In some embodiments, the positive electrode and the negative electrode each comprise, consist essentially of, or consist of one of the group comprising a metal, a carbon material, and an electro-conductive polymer.

In some embodiments, the battery is a non-aqueous redox flow battery and the positive electrolyte and the negative electrolyte each comprise a solvent selected from the group comprising acetonitrile, dimethylacetamide, diethyl carbonate, dimethyl carbonate (DMC), γ-butyrolactone (GBL), propylene carbonate (PC), ethylene carbonate (EC), N-methyl-2-pyrrolidone (NMP), fluoroethylene carbonate, N,N-dimethylacetamide, and mixtures thereof. In some embodiments, the positive electrolyte and the negative electrolyte each comprise the same solvent, optionally wherein the solvent is DMC.

In some embodiments, the positive electrolyte and/or the negative electrolyte comprise an electrolyte salt selected from the group comprising lithium bis(fluorosulfonyl)imide (LiFSI), lithium tetrafluoroborate ($LiBF_4$), lithium hexafluorophosphate ($LiPF_6$), lithium perchlorate ($LiClO_4$), lithium methyltrifluoromethanesulfonate ($CF_3SO_3$), lithium bis(trifluoromethylsulfonyl)imide [$Li(CF_3SO_2)_2N$], tetraethylammonium tetrafluoroborate ($TEABF_4$), tetrabutylammonium tetrafluoroborate ($TBABF_4$), and mixtures thereof. In some embodiments, the first and/or second redox active compositions comprise a metallocene, optionally a ferrocene.

In some embodiments, the presently disclosed subject matte provides an energy storage system comprising a battery comprising the IEM, or a stack comprising a plurality of said batteries, connected to an electrical grid.

In some embodiments, the presently disclosed subject matter provides a method of storing energy, wherein the method comprises the use of a battery comprising the IEM or an energy storage system comprising said battery.

In some embodiments, the presently disclosed subject matter provides a method of preparing an ion conducting polymer comprising a modified PPO, wherein the modified PPO comprises a PPO wherein a portion of monomeric units of the PPO are covalently attached to a sulfonate-substituted arylamino group, wherein the method comprises: (a) contacting a polymer comprising or consisting of poly(2,6-dimethyl-1,4-phenylene oxide) with a free radical halogenation reagent, optionally N-bromo-succinimide (NBS), in the presence of a free radical initiator, optionally azobisisobutyronitrile (AIBN), in a first aprotic solvent, optionally chlorobenzene, thereby forming a partially halogenated polymer; and (b) contacting the partially halogenated polymer with a sulfonated aminoarene in the presence of a catalyst, optionally sodium iodide, and a base, optionally potassium carbonate, in a second aprotic solvent, optionally a mixture chlorobenzene and N-methyl-2-pyrrolidone (NMP). In some embodiments, the sulfonated aminoarene is a sulfonated phenoxyaniline, optionally POATS. In some embodiments, the sulfonated aminoarene is prepared from an aminoarene by an aromatic sulfonation reaction, wherein the aromatic sulfonation reaction is performed by contacting the aminoarene with sulfuric acid.

In some embodiments, the presently disclosed subject matter provides a method of preparing an IEM of the presently disclosed subject matter, the method comprising: (a) providing an ion conducting polymer comprising a modified PPO, wherein the modified PPO comprises a PPO wherein a portion of monomeric units of the PPO are covalently attached to a sulfonate-substituted arylamino group; (b) dissolving the ion conducting polymer in an aprotic solvent, optionally chlorobenzene, NMP, or a mixture thereof; (c) pouring the solution into a mold; and (d) drying the solution. In some embodiments, the method further comprises performing ion exchange to replace a counter-ion present in the ion conducting polymer with a different counter-ion.

In some embodiments, step (b) further comprises dissolving a halogenated PPO or partially halogenated in the aprotic solvent and wherein the method further comprises heating the IEM to prepare a crosslinked IEM, optionally wherein the heating comprises heating the IEM to a temperature of about 120° C. to about 200° C. for about 2 hours to about 24 hours. In some embodiments, step (b) further comprises dissolving a polyether-modified PPO in the aprotic solvent, wherein the polyether-modified PPO comprises a PPO wherein a portion of monomeric units of the PPO are covalently attached to a side chain comprising an oligomeric polyether.

Accordingly, it is an object of the presently disclosed subject matter to provide an ion conducting polymer, a method for preparing the polymer, and related blends, membranes, batteries, and energy storage systems. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description, Figures, and Examples.

DETAILED DESCRIPTION

Figure 1:
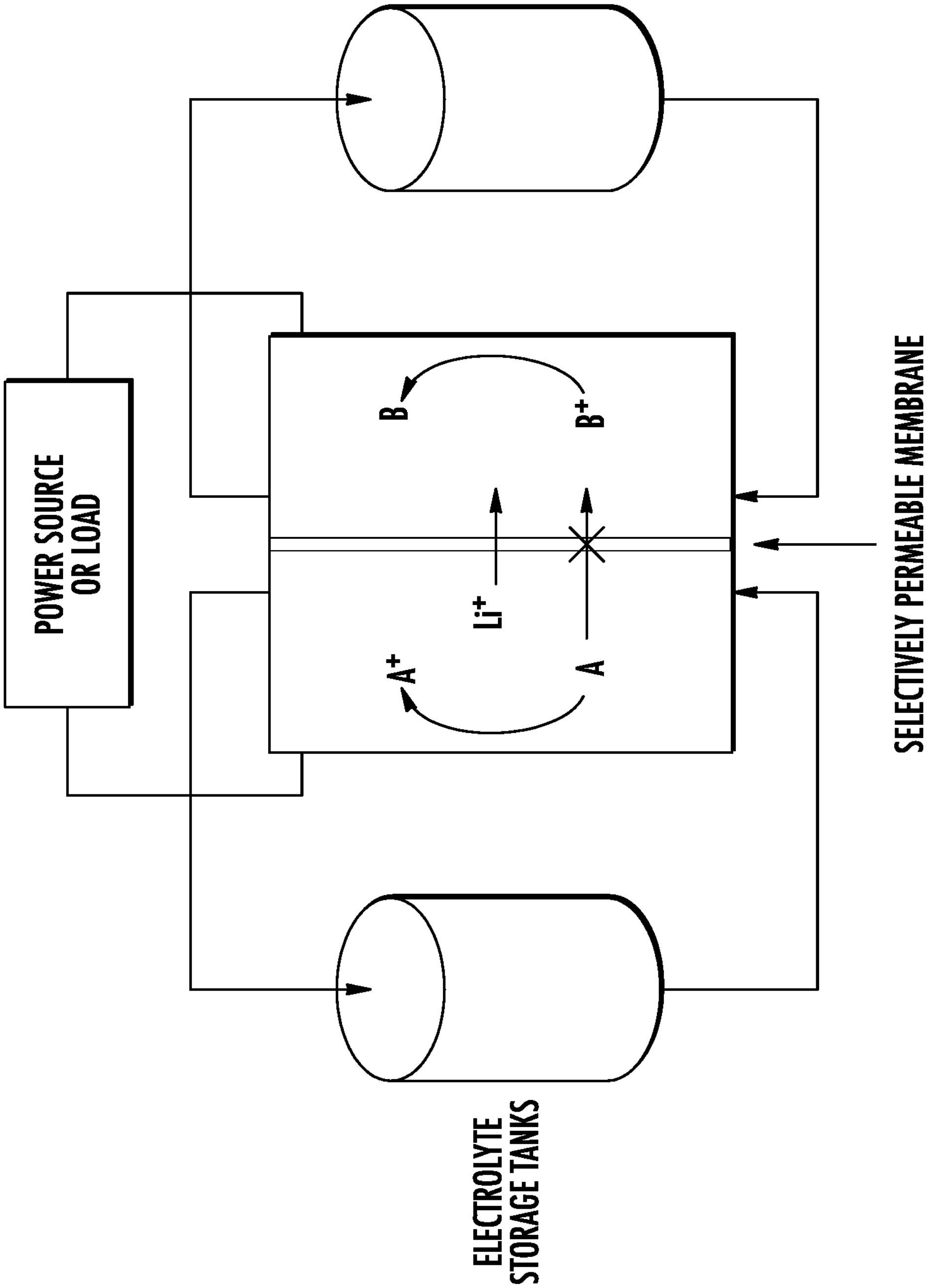
FIG. 1 is a schematic drawing showing a redox flow battery where electrochemical energy is facilitated through redox active molecules ("A" and "B") dissolved in the electrolyte. Lithium cation ($Li^+$) is shown as a charge carrier. During charge/discharge, electrolyte is pumped from the storage tanks through a flow cell containing electrodes and a selectively permeable membrane. A desirable membrane allows fast transport of the charge carrier while inhibiting transport of the redox active molecules.

Non-aqueous redox flow batteries can operate at a higher voltage and energy density than aqueous systems. The further development of these batteries can benefit from membrane separators engineered more particularly for non-aqueous applications. According to one aspect of the presently disclosed subject matter is the preparation and characterization of a series of membranes engineered for a non-aqueous redox flow battery by functionalizing a poly (phenylene oxide) (PPO) backbone with increasing amounts of a sulfonated side chain, phenoxyaniline trisulfonate (POATS). These POATS-PPO membranes appear to be dimensionally stable over a period of at least four months in non-aqueous electrolyte and can exhibit lithium ion conductivities greater than that of previously reported control membranes. Ionic conductivity values, measured in non-aqueous and aqueous electrolytes, reveal solvent-specific ionic conductivity properties that differ from expected scaling relationships based on the ionic conductivity of the bulk electrolyte solution. The permeability of the membranes to ferrocene, as a representative redox active molecule usable in a non-aqueous redox flow battery, does not change significantly with the degree of functionalization of the membrane. As a result, selectivity increases due to the increase in ionic conductivity as the degree of functionalization increases.

The presently disclosed subject matter will now be described more fully. The presently disclosed subject matter can be embodied in different forms and should not be construed as limited to the embodiments set forth herein below. Rather, these embodiments are provided so that this disclosure will be thorough and complete, and will fully convey the scope of the embodiments to those skilled in the art.

I. Definitions

In describing and claiming the presently disclosed subject matter, the following terminology will be used in accordance with the definitions set forth below. The terminology used herein is for the purpose of describing particular embodiments only and is not intended to be limiting of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the presently disclosed subject matter and the claims.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The articles "a" and "an" are used herein to refer to one or to more than one (i.e., to at least one) of the grammatical object of the article. By way of example, "a salt" means one salt or more than one salt.

The term "about", as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%, 5%, 2.5%, 2%, or 1%. In some embodiments, the term "about" means plus or minus 10% of the numerical value of the number with which it is being used. Therefore, about 50% can refer to the range of 45%-55%. In some embodiments, the term "about" means plus or minus 1% of the numerical value of the number with which it is being used. Numerical ranges recited herein by endpoints include all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about".

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units (which can be referred to as "constitutional units" or "monomeric units") derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

A "copolymer" refers to a polymer derived from more than one species of monomer. Copolymers include, for example, block copolymers, graft copolymers and statistical copolymers. In some embodiments a copolymer can be derived from two species of monomer. In some embodiments, the copolymer can be a terpolymer (i.e., be derived from three species of monomer).

As used herein, a "block macromolecule" or "block copolymer" refers to a macromolecule that comprises blocks in a linear sequence. A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

A "statistical copolymer" refers to a copolymer comprising macromolecules in which the sequential distribution of the monomeric units obeys known statistical laws, including, but not limited to Markovian statistics.

As used herein, a "graft macromolecule" or "graft copolymer" refers to a macromolecule comprising one or more species of block connected to the main chain as side chains, wherein the side chains comprise constitutional or configurational features that differ from those in the main chain.

A "branch point" refers to a point on a chain at which a branch is attached. A "branch," also referred to as a "side chain" or "pendant chain," is a monomeric, oligomeric or polymeric offshoot from a macromolecule chain. For example, a "side chain" can refer to a chemical group or moiety (e.g., a monovalent moiety of a monomeric, oligomeric, or polymeric compound) attached (covalently or non-covalently) to a monomeric unit of a polymer or copolymer. In some embodiments, the side chain is attached to less than all of the monomeric units present in a polymeric chain.

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "linear chain" refers to a chain with no branch points intermediate between the boundary units.

A "branched chain" refers to a chain with at least one branch point intermediate between the boundary units.

A "main chain" or "backbone" refers to a linear chain from which all other chains are regarded as being pendant.

An "end group" refers to a constitutional unit that comprises the extremity of a macromolecule or oligomer and, by definition, is attached to only one constitutional unit of a macromolecule or oligomer.

The term "side chain" can refer to a group (i.e., a monomeric, oligomeric or polymeric group) that is attached to a monomeric unit of a main chain.

As used herein the terms "polyelectrolyte" and "ion conducting polymer" refer to a polymer in which a portion of the constitutional units comprise or are attached to a group having an ionizable or ionic group(s), or both.

As used herein the term "alkyl" can refer to $C_{1-20}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. In some embodiments, there can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether, or nitrogen, as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", wherein R' and R" can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

Specific examples of aryl groups include, but are not limited to, cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

The term "aminoarene" as used herein refers to an aromatic molecule substituted by the group $—NH_2$. The aromatic molecule can be further substituted by one or more additional aryl group substituents. Exemplary aminoarenes include, but are not limited to, aniline and phenoxyaniline. As used herein, the term "monovalent derivative" when used in reference to an aminoarene refers to a moiety with the formula —N(H)-aryl or —N(H)-substituted aryl.

"Aralkyl" refers to an -alkyl-aryl group, optionally wherein the alkyl and/or aryl moiety is substituted (e.g., with an alkyl or aryl group substituent).

The terms "halo", "halide", or "halogen" as used herein refer to fluoro, chloro, bromo, and iodo groups.

The term "amine" refers to a chemical compound of the formula $NR_3$, wherein each R is independently selected from H, alkyl, substituted alkyl, aralkyl, substituted aralkyl, aryl, and substituted aryl. The term "primary amine" refers to an amine wherein two R are H. The term "secondary amine" refers to an amine where one R is H. The term "tertiary amine" refers to an amine wherein each R is independently selected from alkyl, substituted alkyl, aralkyl, substituted aralkyl, aryl, and substituted aryl.

The term "amino" refers to a group having the formula $—NR_2$, wherein each R is independently selected from H, alkyl, substituted alkyl, aralkyl, substituted aralkyl, aryl, and substituted aralkyl. In some embodiments, the "amino" group has the formula $—NH_2$.

The term "sulfonate" as used herein refers to the group $—S(=O)_2O^-$ or $—S(=O)_2OH$. The sulfonate group can also include a counter ion, such as a cation of an alkali metal or an ammonium cation (i.e., a positively charged or protonated amine). The term "aprotic solvent" refers to a solvent molecule which can neither accept nor donate a proton. Typical aprotic solvents include, but are not limited to, acetone, acetonitrile, benzene, butanone, butyronitrile, carbon tetrachloride, chlorobenzene, chloroform, 1,2-dichloroethane, dichloromethane (DCM), diethyl ether, dimethylacetamide, N,N-dimethylformamide (DMF), dimethylsulfoxide (DMSO), 1,4-dioxane, ethyl acetate, ethylene glycol dimethyl ether, hexane, N-methyl-2-pyrrolidone, pyridine, tetrahydrofuran (THF), and toluene. Certain aprotic solvents are polar solvents. Examples of polar aprotic solvents include, but are not limited to, acetone, acetonitrile, butanone, N,N-dimethylformamide, and dimethylsulfoxide. Certain aprotic solvents are non-polar solvents (e.g., non-polar organic solvents). Examples of nonpolar organic solvents include, but are not limited to, diethyl ether, aliphatic hydrocarbons, such as hexane, aromatic hydrocarbons, such as benzene and toluene, and halogenated hydrocarbons, such as carbon tetrachloride, DCM, and chloroform.

II. General Considerations

Rising usage of renewable energy sources has created a challenge for the electrical grid because the power provided by many renewable sources can be intermittent and out of the control of power plant operators.[1] Grid scale energy storage technologies are needed to resolve differences in energy supply and demand on a short time scale and through daily supply and demand cycles. Redox flow batteries (RFBs) are one potential grid scale energy storage solution.[1-6] FIG. 1 shows a schematic drawing of a RFB. In this design, battery energy and power are determined by the electrolyte volume and by the electrode and membrane area, respectively, and thus energy and power are often considered decoupled. This enables modular and scalable designs for applications with large capacity and long duration of delivered power.

Aqueous RFBs are available commercially but using water as the solvent is not without drawbacks. The electrochemical stability window of water is relatively small (i.e., generally taken to be the thermodynamic value of 1.23 V, although certain salts and electrode materials can slightly increase this value), and operating a battery at low voltage limits the battery energy density.[3,6] Using a non-aqueous (organic) solvent instead of water expands the electrochemical stability window and provides a larger maximum voltage per cell. In addition, a diverse range of organic redox active molecules are highly soluble in organic solvents.[4,5] These organic electroactive materials can offer tunable redox potentials through substituent modification. Additionally, they are often more soluble than their aqueous analogs, and the ability to concentrate active material in the solvent increases energy density.[7-10]

Studies have investigated potential redox couples for non-aqueous RFBs,[4,11,12] but less attention has been given to the membrane separator that is required in these batteries. During battery operation, a charge carrier is transported from one half of the battery to the other to balance the movement of electrons in the battery. To prevent self-discharge and a permanent loss of battery capacity,[3] the ideal membrane provides select transport of these charge carriers while simultaneously preventing the transport (or crossover) of the redox active molecule(s).

Most studies on non-aqueous RFB test cells have used either nanoporous, microporous, or ion-exchange membrane (IEM) separators. Nanoporous and microporous separators provide favorable ionic conductivity but can do little to prevent crossover, particularly for some active species.[11,13,14] IEMs can provide better crossover resistance but often provide lower conductivity than their nanoporous counterparts, resulting in a high internal resistance and low energy efficiency. Some currently used IEMs include perfluorinated cation exchange membranes[15,16] based on tetrafluoroethylene-fluorovinylether copolymers with acid functions, such as those sold under the tradename NAFION® (Chemours Company, Wilmington, Delaware, United States of America) and an anion exchange membrane sold under the tradename NEOSPETA™ AHA (Tokuyama Corporation, Shunan, Japan).[13,17] However, both of these membranes were designed for use in aqueous systems, which can lead to sub optimal performance in non-aqueous systems. For instance, non-aqueous solvents can interact more favorably with polymers compared to water, causing some polymeric membranes to swell excessively in non-aqueous electrolytes.[15,17] Also, little is known about how the difference in solvent interactions affect ion transport properties. Other options include porous separators, which can exhibit high crossover unless a solid suspension of active materials are used,[7,18,19] or ceramic membranes, which are brittle and can sometimes react with the redox active molecule.[20]

To improve the performance of non-aqueous flow batteries, the presently disclosed subject matter provides, in one aspect, an IEM that combines high conductivity and low crossover in non-aqueous electrolytes. For example, the presently disclosed IEM provides increased conductivity compared to previously reported IEMs. More particularly, the presently disclosed subject matter provides an IEM based on a rigid, high-glass transition temperature polymer (to resist swelling), functionalized with fixed negatively charged groups to promote cation conduction. The ionic conductivity properties of the IEM were studied in both organic and aqueous electrolytes to observe how solvent-specific interactions affected the ion transport properties of the membrane.

In some embodiments, the presently disclosed subject matter provides a poly(phenylene oxide) (PPO) polymer functionalized with a sulfonated side chain to create a cation exchange membrane for non-aqueous RFB applications. The PPO base polymer (i.e., poly(2,6-dimethyl-1,4-phenylene oxide)) is chemically stable, can be readily modified, and has a high glass transition temperature.[21-24] A phenoxyaniline trisulfonate (POATS) side chain was attached to the PPO to introduce negatively charged fixed charge groups to promote cation conduction. POATS is chemical similar to PPO and has a high charge density, which can increase charge carrier concentration and can induce some level of nano- or micro-phase separation, which can improve conductivity.[27] Since the presently disclosed POATS-PPO membranes are cation exchange membranes, their performance was compared to a perfluorinated cation exchange membrane polymers sold under the trade name NAFION® 117, and a membrane based on a similar perfluorinated material blended with polyvinylidene difluoride (PVDF), previously evaluated within the context of non-aqueous flow batteries.[20] The exemplary charge carrier used in the membrane was $Li^+$, and thus, all membranes were lithiated (i.e., converted to the lithium counter-ion form) before any measurements were made.

A wide range of non-aqueous flow battery electrolytes have been reported. For the studies described hereinbelow, 1 M lithium bis(fluorosulfonyl)imide (LiFSI) in dimethyl carbonate (DMC) was used as an exemplary electrolyte. LiFSI has been shown to be stable and have a high ionic conductivity in carbonate-based electrolytes, making it suitable for high rate applications, which is generally desirable for RFBs.[28,29] DMC was chosen because LiFSI is highly soluble in DMC (up to 5 M), and of the carbonate solvents, dimethyl carbonate has a particularly low viscosity (0.59 cP), which could help to limit pumping losses in a flow battery.[30,31] The presently disclosed membranes were also tested in an aqueous electrolyte, 1 M LiCl, to determine how membrane properties are affected by the different solvent environments.

The presently disclosed modified PPO can also be modified with polyether oligomer side chains (such as side chains comprising oligomers of polyethylene glycol (PEG)), which can improve the conductivity of membranes prepared from the polymer. Additionally, the membranes prepared from the POATS-, PEG- or POATS/PEG-modified PPO can be crosslinked, e.g., by heat treatment of the polymer with a brominated or other halogenated PPO. Crosslinking can alter the solvent uptake properties of the membrane, thereby changing the crossover rates of the membrane and/or the mechanical strength of the membranes.

III. Ion Conducting Polymers and Related Membranes

In some embodiments, the presently disclosed subject matter provides an ion conducting polymer. In some embodiments, the ion conducting polymer is suitable for use as a membrane in an organic (or non-aqueous) RFB. In some embodiments, the polymer can combine the following properties: (1) an ability to conduct a desired ion (e.g., $Li^+$) to counterbalance electron flow in a RFB; (2) the ability to limit crossover of redox active compounds used in electrolytes of the RFB (e.g., to limit loss of capacity and efficiency in the RFB); and (3) stability in the electrolyte environment, such as in organic solvents typically used in organic flow batteries and in aqueous environments used in aqueous flow batteries. If the polymer is not stable in the electrolyte environment, the membrane comprising the polymer can dissolve and/or degrade and no longer provide desirable conductivity and selective permeability. To date, very few polymer membranes have been designed particularly for non-aqueous RFB applications. Often, conventional aqueous flow battery membranes have been modified, resulting in relatively high redox active compound crossover and/or relatively low long-term stability.

In some embodiments, the presently disclosed subject matter provides a polymer with an adjustable functionality with regard to the density of charge groups (e.g., sulfonate groups) and the presence and/or extent of cross-linking. For example, as the density of the charge groups is increased, the conductivity increases. If the membrane is crosslinked, the ability of the membrane to swell in solvent can be reduced, which can also result in lower crossover rates and/or increased mechanical strength. Additionally or alternatively, the polymer can be modified with other side chains, including side chains comprising polyether groups. The addition of ether functionality in the side chains can improve the conductivity of the membranes. In some embodiments, the polyether side chains can also include charged groups (e.g., sulfonate groups, carboxylate groups, etc.) in addition to the ether groups.

In some embodiments, the presently disclosed subject matter provides an ion conducting polymer comprising modified PPO. For instance, in some embodiments, a portion of the monomeric units of the PPO are modified by attachment to a charge group (e.g., sulfonate)-substituted moiety and/or a portion of the monomeric units of the PPO are modified by attachment to a polyether-containing moiety (e.g., a polyethylene glycol (PEG)-containing moiety). In some embodiments, one portion of the monomeric units are modified by a charge group (e.g., sulfonate)-substituted side chain (e.g., POATS or another sulfonate-substituted arylamino side chain) and a second portion of monomeric units in the same PPO chain are modified with a polyether-containing side chain. In some embodiments, a portion of the monomeric units of a PPO can modified by a side chain that contains both polyether-containing moieties and charge group (e.g., sulfonate)-substituted moieties.

In some embodiments, the charge-group substituted moiety is a sulfonate-substituted arylamino group. In some embodiments, a sulfonate-substituted arylamino group is covalently attached to a portion of the monomeric units in the PPO. The sulfonate-substituted arylamino group can be covalently attached, for example, to a methyl group attached to a phenylene group in the PPO monomeric unit.

The sulfonate-substituted arylamino group can include at least one and, in some embodiments, more than one (e.g., 2, 3, 4, or more) sulfonate substituent. In some embodiments, each sulfonate-substituted arylamino group can include three sulfonate substituents. In some embodiments, the sulfonate-substituted arylamino group is a monovalent derivative of a sulfonate-substituted aniline or substituted aniline, such an aniline substituted by one or more aryl-containing aryl group substituents. Thus, in some embodiments, the sulfonate-substituted aniline is an aryl or aryloxy-substituted aniline. In some embodiments, the sulfonate-substituted aniline is a monovalent derivative of a sulfonate-substituted phenoxyaniline. In some embodiments, the sulfonate-substituted arylamino group is a monovalent derivative of phenoxyaniline trisulfonate (POATS).

In some embodiments, the sulfonate-substituted arylamino group comprises one or more protonated sulfonate groups (i.e., wherein each of the protonated sulfonate groups has a structure $-S(=O)_2OH$). The sulfonate groups can also be in a salt form, i.e., where the sulfonate group has a structure $-S(=O)_2O^-X^+$. $X^+$ can be any desired counter ion. In some embodiments, $X^+$ is an ammonium cation (e.g., triethylammonium or another trialkylammonium cation). In some embodiments, X+ is an alkali metal cation (e.g., $Li^+$, $Na^+$, or $K^+$), optionally wherein $X^+$ is $Li^+$. In other embodiments, the counter-ion is a multi-valent ion (e.g., the counter-ion $X^{2+}$ is $Mg^{2+}$ where the sulfonate group structure would be $(-S(=O)_2O^-)_2X^{2+}$), i.e., where the counter-ion is associated with two single sulfonate groups.

In some embodiments, up to about 50% of the monomeric units of the PPO are modified by attachment to a sulfonate-substituted arylamino group. In some embodiments, at least about 2%, at least about 2.5% at least about 3%, at least about 3.5%, at least about 4% or at least about 4.5% of the PPO monomeric units are modified by the sulfonate-substituted arylamino group. Thus, in some embodiments, between about 2.5% and about 50% (e.g., about 2.5%, 5%, 10%, 15%, 20%, 25%, 30%, 35%, 40%, 45%, or about 50%) of the monomeric units of the PPO are modified. In some embodiments, about 2% to about 30% or about 4% to about 30% of the monomeric units of the PPO are modified by the sulfonate-substituted arylamino group.

In some embodiments, about 2.5% to about 9.1% of the monomeric units of the PPO are modified by the sulfonate-substituted arylamino group. Thus, in some embodiments, about 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, or about 9.1% of the monovalent units of the PPO have a sulfonate-substituted arylamino side chain.

In some embodiments, about 4.6% to about 9.1% or the monovalent units of the PPO have a sulfonate-substituted arylamino side chain. In some embodiments, about 4.6%, about 6.3%, about 7.2%, or about 9.1% of the PPO monomeric units have a sulfonate-substituted arylamino side chain.

In some embodiments, the sulfonate-substituted arylamino group can be directly attached to a carbon atom of a monomeric unit of the PPO. In some embodiments, the sulfonate-substituted arylamino group is directly attached to a non-aromatic carbon atom of a PPO monomeric unit, i.e., to one of the methyl groups in the PPO monomeric unit. Accordingly, in some embodiments, the ion conducting polymer comprises a structure of Formula (I) or Formula (II):

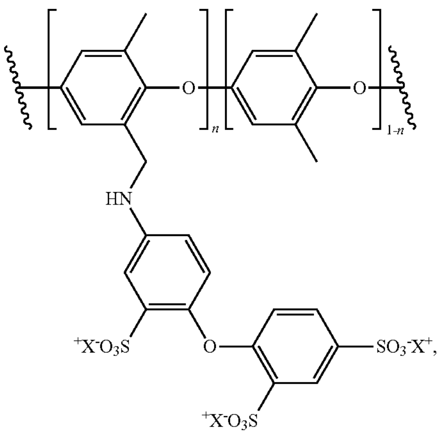

or

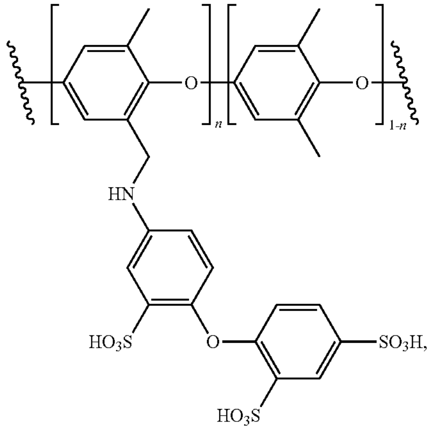

wherein $0<n\leq 0.50$ and $X^+$ is a cation. In some embodiments, $0.02\leq n\leq 0.30$. In some embodiments, $0.025\leq n\leq 0.091$. In some embodiments, $0.046\leq n\leq 0.091$. In some embodiments, n is selected from 0.046, 0.063, 0.072, and 0.091. Thus, as noted above, the sulfonate groups of the side chain can be protonated (i.e., be present in the $-S(=O)_2OH$ form) or be present as a salt, i.e., in $-S(=O)_2O^-X^+$ form, wherein $X^+$ is a counter ion, such as an ammonium cation or an alkali metal cation. In some embodiments, $X^+$ is, for example, an alkali metal ion, such as $Na^+$, $K^+$ or $Li^+$. In some embodiments, $X^+$ is a trialkylammonium ion, such as a triethylammonium ion.

In some embodiments, a portion of the monomeric units of the PPO are modified with a polyether-containing side chain. For example, a portion of the monomeric units of the PPO can be covalently attached to an oligomeric polyether or a side chain comprising an oligomeric polyether. The oligomeric polyether can comprise an oligomer of a polyalkylene glycol, such as a PEG or polypropylene glycol (PPG). The oligomeric polyether side chain can include 2 to about 10 monomeric units and an alkyl, aralkyl or aryl end/terminal group. In some embodiments, the polyether-containing side chain comprises the group $-O-CH_2CH_2-(OCH_2CH_2)_m-OR$, wherein R is phenyl, benzyl, or C1-C5 alkyl (i.e., methyl, ethyl, propyl, butyl, or pentyl) and m is an integer between 1 and 9 (i.e., 1, 2, 3, 4, 5, 6, 7, 8, or 9). In some embodiments, R can be an alkyl, aralkyl, or aryl moiety substituted with one or more charged groups (e.g., one or more sulfonate groups). In some embodiments, m is an integer between 1 and 3. In some embodiments, R is phenyl. The polyether-containing side chain can be covalently attached to a monomeric unit of a PPO via an ether linkage to a methyl group on a phenylene moiety in the PPO backbone. Thus, the presently disclosed modified PPO can comprise a portion of monomeric units having the formula:

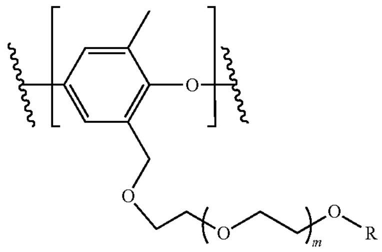

wherein m is an integer between 1 and 9 (e.g., 1, 2 or 3) and R is selected from alkyl (e.g., methyl or ethyl), substituted alkyl, aralkyl (e.g., benzyl), substituted aralkyl, aryl (e.g., phenyl) and substituted aryl.

In some embodiments, the polyether group can be attached to the monomeric unit of the PPO indirectly e.g., via a bivalent linker group, such as an alkylene, aralkylene, or arylene group. Thus, in some embodiments, the presently disclosed modified PPO can comprise a portion of monomeric units having the formula:

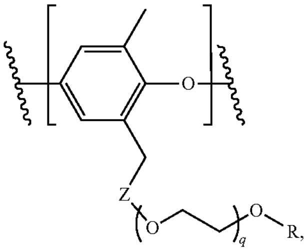

where q is an integer between 2 and 10 (i.e., 2, 3, 4, 5, 6, 7, 8, 9, or 10); R is selected from alkyl (e.g., methyl or ethyl), substituted alkyl, aralkyl (e.g., benzyl), substituted aralkyl, aryl (e.g., phenyl) and substituted phenyl; and Z is a bivalent group linker group, optionally a bivalent linker group comprising a heteroatom (e.g., 0 or N) and bivalent arylene group, such as phenylene or substituted phenylene (e.g., sulfonate-substituted phenylene). Thus, in some embodiments, Z is —O-phenylene- or —NH— phenylene-, optionally wherein the phenylene ring is substituted with one or more aryl group substituents (e.g., sulfonate, alkoxy, etc.).

Accordingly, in some embodiments, the modified PPO polymer can comprise a structure of Formula (III):

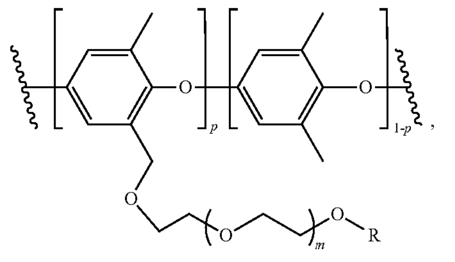

wherein 0<p<0.50, m is 1-9 (e.g., 1, 2, or 3), and R is alkyl, substituted alkyl, aralkyl substituted aralkyl, aryl, or substituted aryl. In some embodiments $0.02 \leq p \leq 0.30$. In some embodiments, R is phenyl and the modified PPO can be referred to as a PEG phenyl ether-modified PPO (i.e., a PEGPE-PPO). In some embodiments, R is an aryl or aralkyl group wherein substituted with one or more sulfonate groups, e.g., $—CH_2—C_6H_4—SO_3H$ or $—CH_2—C_6H_4—SO_3^-X^+$, wherein $X^+$ is a cation, e.g., $Li^+$.

In some embodiments, the modified PPO can comprise a structure of Formula (IV):

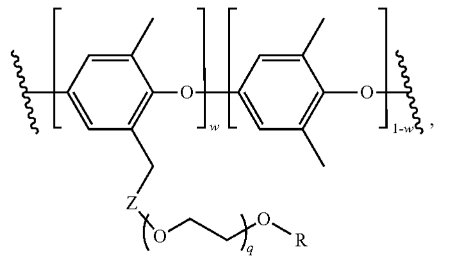

where 0<w<0.50, q is an integer between 2 and 10 (i.e., 2, 3, 4, 5, 6, 7, 8, 9, or 10); R is selected from alkyl (e.g., methyl or ethyl), substituted alkyl, aralkyl (e.g., benzyl), substituted aralkyl, aryl (e.g., phenyl) and substituted aryl; and Z is a bivalent group linker group, optionally a bivalent linker group comprising a heteroatom (e.g., 0 or N) and a bivalent arylene group, such as phenylene or substituted phenylene (e.g., sulfonate-substituted phenylene). Thus, in some embodiments, Z is —O-phenylene- or —NH-phenylene-, optionally wherein the phenylene ring is substituted with one or more aryl group substituents. In some embodiments $0.02 \leq w \leq 0.3$.

The PPO modified by the sulfonate and/or polyether-containing side chain groups can be prepared from a commercially available PPO or a PPO prepared via a polymerization method known in the art. In some embodiments, the modified PPO can be prepared from a PPO produced via an oxidative coupling polymerization of 2,6-dimethylphenol.

In some embodiments, the presently disclosed subject matter provides a composition comprising a mixture or blend comprising two or more polymers (e.g., two or more modified PPOs or a modified PPO and an unmodified PPO). In some embodiments, the blend includes at least one PPO comprising a portion of monomeric units comprising a sulfonate-substituted side chain group (e.g., a sulfonate-substituted arylamino side chain group, such as POATS). In some embodiments, the composition comprises a first modified PPO comprising a sulfonate-substituted side chain (e.g., a sulfonate-substituted arylamino side chain group) and a second modified PPO comprising a polyether-containing side chain. In some embodiments, the composition can comprise a halogenated PPO or a partially halogenated PPO. In some embodiments, the composition can comprise an unmodified PPO.

In some embodiments, a modified PPO of the presently disclosed subject matter or a composition comprising one or more modified PPO is crosslinked. Crosslinking can be performed by preparing a mixture (e.g., a blend) of the modified PPO and a halogenated or partially halogenated PPO (e.g., a Br—PPO) and heating the mixture, e.g., to a temperature of about 120° C. to about 200° C. for a period of time. In some embodiments, an unmodified PPO can also be included in the mixture to be cross-linked. In some embodiments, the period of time is about 2 hours to about 24 hours. In some embodiments, the mixture is heated to a temperature of about 150° C. In some embodiments, the period of time is about 12 hours to about 20 hours (e.g., about 12, 13, 14, 15, 16, 17, 18, 19, or about 20 hours). At the increased temperature of the crosslinking, the phenylene ring of a PPO monomeric unit can act as a nucleophile in a substitution reaction at a halo (e.g., bromo)-substituted methyl group in a halogenated monomeric unit in the halogenated PPO, resulting in the formation of a carbon-carbon bond between a carbon in the phenylene ring of a monomeric unit of one PPO and a carbon of a halo-substituted methyl group in the monomeric unit of a halogenated PPO (and the loss of HBr). See Scheme 1, below, which shows crosslinking between a partially brominated PPO and another PPO. The extent of crosslinking can be controlled by varying the mass percent of the halogenated-PPO in the mixture and/or by varying the degree of halo substitution in the halogenated-PPO.

Scheme 1. Crosslinking reaction mechanism.

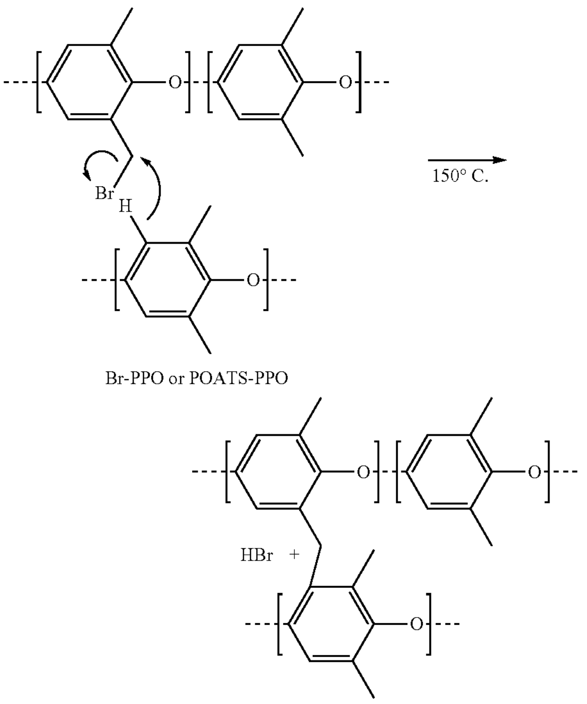

In some embodiments, the presently disclosed subject matter provides an ion exchange membrane (IEM) comprising, consisting essentially of, or consisting of the presently disclosed ion conducting polymer or a mixture or blend thereof. In some embodiments, the membrane comprises a modified PPO wherein about 2% to about 50% of the monomeric units of the PPO are modified, e.g., via a sulfonate-substituted group and/or a polyether group (e.g., an oligomeric PEG-containing moiety). In some embodiments, about 4% to about 30% of the monomeric units are modified (e.g., with a sulfonate-substituted arylamino side chain that is directly attached to a PPO monomeric unit, an oligomeric polyether-containing side chain, or a side chain comprising both sulfonate groups and an oligomeric polyether-containing linker). In some embodiments, the modified PPO comprises a portion of monomeric units comprising a first side chain (e.g., a sulfonate-substituted arylamino side chain) and another portion of monomeric units comprising a second side chain (e.g., an oligomeric polyether-containing side chain) that is different than the first side chain. In some embodiments, the membrane comprises a blend of a first modified PPO comprising a sulfonate-substituted side chain (e.g., a sulfonate-substituted arylamino side chain group) and a second modified PPO comprising a polyether-containing side chain. In some embodiments, the membrane can further include an unmodified PPO.

In some embodiments, the membrane comprises a modified PPO wherein about 4.6% to about 9.1% of the monomeric units comprise a sulfonate-substituted arylamino side chain (e.g., a POATS side chain). While POATS-PPOs having less than about 4.6% modified monomeric units or more than about 9.1% modified monomeric units can have less desirable mechanical properties (e.g., becoming brittle when dry), the mechanical properties of the presently disclosed membranes can be adjusted, for example, by including side chains with a lower number of charge groups (e.g., side chains with 1 or 2 sulfonate groups), by crosslinking the membrane, and/or by using PPOs with higher molecular weights.

Accordingly, in some embodiments, the membrane comprises crosslinked PPO (i.e., crosslinked POATS-PPO and/or crosslinked PEG-PPO). Cross-linking can improve the strength of the membrane and/or limit solvent uptake. In some embodiments, the crosslinked PPO comprises a membrane cast from a solution comprising a blend of an ion conducting modified PPO of the presently disclosed subject matter and a halogenated PPO (e.g., a Br—PPO) and then heated to induce crosslinking. In some embodiments, the blend can include one or more additional PPOs, including an unmodified PPO. The extent of crosslinking can be controlled by varying the amount of halogenated PPO and/or the extent of halogenation of the halogenated PPO. Thus, if a more extensively crosslinked membrane is desired, the blend can be adjusted to include a higher weight % of the halogenated PPO and/or a more extensively halogenated PPO. In some embodiments, the blend can comprise about 50% by weight of a relatively less halogenated PPO (i.e., a PPO with about 15% or less, or about 10% or less halogenated monomeric units). In some embodiments, the blend can comprise a lower amount of a more extensively halogenated PPO (e.g., a PPO with at least about 50% or up to about 100% of the monomeric units halogenated).

Depending upon the intended application of the IEM, it can have any suitable dimensions. In some embodiments, the IEM can have a thickness of about 40 microns to about 100 microns (e.g., about 40, 45, 50, 55, 60, 65, 70, 75, 80, 85, 90, 95, or about 100 microns). In some embodiments, the IEM is about 40 to about 50 microns thick (e.g., about 40, 41, 42, 43, 44, 45, 46, 47, 48, 49 or about 50 microns). However, the IEM can also be thinner or thicker. In some embodiments, the IEM has a thickness between about 1 and about 40 microns. In some embodiments, the IEM has a thickness that is less than 1 micron, less than about 0.5 microns, or less than about 0.25 microns. In some embodiments, the IEM has a thickness of about 1 to about 100 nanometers (nm), or about 10 to about 100 nm. In some embodiments, the membrane is prepared by casting a solution of the polymer. In some embodiments, such as when a thinner membrane is used, the membrane can be prepared by coating the presently disclosed polymer on a porous substrate. For example, a solution of the polymer can be sprayed or painted onto a porous substrate. Any porous substrate that is compatible with the intended electrolyte and/or other conditions in which the membrane is to be exposed can be used. For instance, the porous substrate can be polymeric or ceramic. Suitable polymer substrates include polyolefin substrates, such as, but not limited to, polyethylene and polypropylene.

The ion exchange capacity of the IEM can vary depending upon the level of modification of the PPO, e.g., with the sulfonate- and/or polyether side chains. In some embodiments, such as when the IEM comprises a PPO polymer with about 4.6% to about 9.1% monomeric units modified with POATS, the IEM can have an ion exchange capacity (determined using a titration method) of about 0.75 milliequivalents (meq) per gram dry polymer to about 1.2 meq per gram dry polymer.

The IEM membranes are stable in a wide variety of organic solvents and in aqueous solutions. In some embodiments, the IEM is stable in organic solvent and/or a non-aqueous electrolyte solution such as 1 M lithium bis(fluorosulfonyl)imide (LiFSI) in dimethyl carbonate (DMC), for more than one, two, three or four months.

Solvent uptake of the membranes can vary depending upon the type of solvent, the amount and type of side chain modification, and the extent of crosslinking. For example, solvent uptake can be relatively low in acetonitrile (e.g., about 5%) and water (e.g., about 4% to about 12% uptake) and high (e.g., about 100%) in dimethyl sulfoxide (DMSO). In some embodiments, the IEM comprises about 4.6% to about 9.1% monomeric units with a POATS side chain and has a solvent uptake for aqueous solution (e.g., deionized (DI) water) of about 7 weight (wt) % to about 10 wt % and a solvent uptake for dimethyl carbonate (DMC) or 1M LiFSI in DMC of about 30 wt % to about 40 wt % (e.g., about 30 wt %, 31 wt %, 32 wt %, 33 wt %, 34 wt %, 35 wt %, 36 wt %, 37 wt %, 38 wt %, 39 wt %, or about 40 wt %).

Ionic conductivity for the presently disclosed IEMs can vary depending upon the electrolyte. In some embodiments, the IEM has an ionic conductivity in 1M LiFSi in DMC of about 0.015 millisiemens per centimeter (mS $cm^{-1}$) to about 0.061 mS $cm^{-1}$. In some embodiments, the IEM has a ferrocene permeability measured in 1 M LiFSI in DMC of between about $10^4$ $cm^2$ per s ($cm^2$ $s^{-1}$) and $10^\$$ $cm^2$ $s^{-1}$.

The selectivity of the IEM is dependent upon the electrolyte and crossover material/redox active component(s). In some embodiments, the IEM has a selectivity of more than about 1,000 siemens per cubic centimeter per second (S $cm^{-3}$ s) and less than or equal to about 21,000 S $cm^{-3}$ s when the crossover material is ferrocene and the electrolyte is 1M LiFSI in DMC.

IV. Batteries, Flow Cells and Separation Devices

The presently disclosed ion conducting polymer and the IEM thereof can be used in a variety of electrochemical and other applications. For example, when processed as a solid polymer electrolyte, the conductivity of the presently disclosed ion conducting polymer is suitable for polymer battery applications, including as a lithium ion or other alkali ion conducting electrolyte. TGA analysis of the exemplary membranes of the presently disclosed subject matter indicate that they do not have significant mass loss or decomposition until about 400° C. This high thermal stability suggests that the polymer membranes of the ion conducting polymer can be used as a high temperature alkali ion conducting electrolyte. The stability of the membranes in organic solvents and their selective transport for different cations suggests that the material can also be useful for electrochemically driven separation processes involving the separation of cations in organic solvents, such as in waste streams from chemical processing facilities. The charge density and stability of the membranes in aqueous electrolytes indicates that the presently disclosed membranes can be used in devices and apparatus for desalination processes, such as reverse osmosis, nanofiltration, membrane capacitive deionization or electrodialysis, as well as for electromembrane processes, such as reverse electrodialysis and concentration batteries.

In some embodiments, the presently disclosed subject matter provides a battery, fuel cell, or separation device comprising an IEM disclosed hereinabove, i.e., comprising, consisting essentially of, or consisting of a modified PPO polymer as described herein.

In some embodiments, the presently disclosed subject matter provides a RFB comprising the presently disclosed IEM. The RFB can be an aqueous or non-aqueous (or organic) RFB. In some embodiments, the battery comprises, in addition to the IEM, a positive electrode; a positive electrolyte comprising a first redox active composition, wherein said positive electrolyte is in contact with the positive electrode; a negative electrode; and a negative electrolyte comprising a second redox active composition, wherein said negative electrode is in contact with the negative electrode; wherein the IEM is interposed between the positive electrode and the negative electrode.

In some embodiments, the battery further comprises: a positive electrode reservoir or compartment comprising the positive electrode immersed within the positive electrolyte, and a negative electrode reservoir or compartment comprising the negative electrode immersed within the negative electrolyte. In some embodiments, the positive electrode reservoir forms a first half-cell and the negative electrode reservoir forms a second half-cell. The first and second half-cells can be defined by one or more housings or enclosures which can together make up a battery cell for the RFB.

In some embodiments, the battery comprises a first circulation loop comprising a positive electrolyte storage tank containing the positive electrolyte, piping (or tubing) for transporting the positive electrolyte, a chamber (e.g., a reservoir or compartment) in which the positive electrode is in contact with the positive electrolyte, and a pump to circulate the positive electrolyte through the first circulation loop; and a second circulation loop comprising a negative electrolyte storage tank containing the negative electrolyte, piping (or tubing) for transporting the negative electrolyte, a chamber (e.g., a reservoir or compartment) in which the negative electrode is in contact with the negative electrolyte, and a pump to circulate the negative electrolyte through the circulation loop. The battery can further include valves or openings to connect the components of each circulation loop. The pump of each circulation loop can be positioned in any convenient location (e.g., between the storage tank and the chamber with the electrode, integral to the chamber with the electrode, or integral to storage tank). Pumps suitable for use in the flow batteries described herein include internal gear pumps, screw pumps, shuttle block pumps, flexible vane pumps, sliding vane pumps, circumferential piston pumps, helical twisted root pumps, piston pumps, diaphragm pumps, peristaltic pumps, centrifugal pumps, and the like, which are well known in the liquid pumping art. The utility of a given pump can be dependent on the chemical resistance of the pump to the electrolyte components in contact therewith (i.e., materials compatibility).

Any suitable material can be used for the positive electrode and the negative electrode. In some embodiments, each electrode comprises, consists essentially of, or consists of a metal, a carbon material, an electroconductive polymer, or a mixture thereof. In some embodiments, the positive and/or negative electrodes comprise, consist essentially of, or consist of a metal, such as aluminum, platinum, copper, nickel or stainless steel. Suitable electrode carbon materials include, but are not limited to, carbon black, activated carbon, amorphous carbon, graphite, graphene, or a nanostructured carbon material. The electrodes can be porous, fluted, or smooth.

In some embodiments, the battery is a non-aqueous RFB and the positive electrode, which can act as a current collector, is immersed in the positive electrolyte (or "catholyte") comprising an electrochemically stable organic solvent, and the negative electrode, which can also function as a current collector, is immersed in the negative electrolyte (or "anolyte"), which also comprises an electrochemically stable organic solvent. The IEM partitions the negative electrode/anolyte from the positive electrode/catholyte. During charging and discharging, the electrolytes are circulated over their respective electrodes, while cations shuttle between the two electrolytes (through the IEM) to balance the charges that develop as a result of oxidation and reduction of redox active components in the electrolytes.

In some embodiments, the anolyte and the catholyte both comprise a redox active component and an electrolyte salt (i.e., a single salt or a combination of two or more different salts). In some embodiments, the redox active component of the catholyte is selected to have a higher redox potential than the redox reactive component of the anolyte.

In some embodiments, the positive electrolyte and the negative electrolyte each comprise an electrochemically stable solvent selected from the group comprising organic carbonates, such as ethylene carbonate, propylene carbonate, dimethyl carbonate, diethyl carbonate, and ethyl methyl carbonate; as well as, for example, ethers, esters, and nitriles (e.g., acetonitrile). Exemplary ethers include, but are not limited to dimethoxyethane, diethoxyethane, dibutoxyethane, diglyme (i.e., diethylene glycol dimethyl ether), triglyme (i.e., triethylene glycol dimethyl ether), tetraglyme (i.e., tetraethylene glycol dimethyl ether), tetrahydrofuran, 2-methyltetrahydrofuran, 2,5-dimethyltetrahydrofuran, 1,3-dioxolane, and 4-methyl-1,3-dioxolane. In some embodiments, the solvent is selected from the group comprising acetonitrile, dimethylacetamide, diethyl carbonate, dimethyl carbonate (DMC), γ-butyrolactone (GBL), propylene carbonate (PC), ethylene carbonate (EC), N-methyl-2-pyrrolidone (NMP), fluoroethylene carbonate, N,N-dimethylacetamide, and mixtures thereof. In some embodiments, the positive electrolyte and the negative electrolyte each comprise the same solvent. In some embodiments, the solvent is DMC.

In some embodiments, the positive electrolyte and/or the negative electrolyte comprise one or more electrolyte salt or mixtures thereof. The electrolyte salts can comprise, for example, alkali metal salts, alkaline earth salts, organic salts, and the like. In some embodiments, the electrolyte salts are alkali metal salts (e.g., lithium salts such as lithium tetrafluoroborate or lithium hexafluorophosphate, or sodium salts). The electrolyte salt can aid in maintaining a charge balance between the negative electrolyte and the positive electrolyte in the positive compartment without, however, participating in a redox reaction. In general, suitable electrolyte salts are chemically inert over the range of potential in the RFB, have high ionic conductivity to ensure low resistance to the passage of current, and do not obstruct electron exchange on the electrode surfaces.

In some embodiments, the electrolyte salt(s) is/are selected from alkali metal salts (e.g., lithium or sodium salts) of anions, such as $BF_4^-$, $PF_6^-$, $ClO_4^-$, $AsF^-$, $CF_2SO_2^-$, $N(SO_2CF_3)_2^-$, $N(SO_2CF_2CF_3)_2^-$, and $B(C_2O_4)_2^-$. In some embodiments, the electrolyte salt(s) is/are selected from the group comprising lithium bis(fluorosulfonyl)imide (LiFSI), lithium tetrafluoroborate ($LiBF_4$), lithium hexafluorophosphate ($LiPF_6$), lithium perchlorate ($LiClO_4$), lithium methyltrifluoromethanesulfonate ($LiCF_3SO_3$), lithium bis(trifluoromethylsulfonyl)imide [$Li(CF_3SO_2)_2N$], tetraethylammonium tetrafluoroborate ($TEABF_4$), tetrabutylammonium tetrafluoroborate ($TBABF_4$), and mixtures thereof. In some embodiments, the electrolyte salt comprises or consists of LiFSI.

Suitable redox active components include organic compounds comprising a conjugated unsaturated moiety, a boron cluster compound, or a combination thereof. The conjugated unsaturated moiety can be aromatic, non-aromatic, or a combination thereof, and can comprise carbon-carbon unsaturated bonds, carbon-heteroatom unsaturated bonds, or a combination of carbon-carbon and carbon-heteroatom unsaturated bonds. The heteroatom of any carbon-heteroatom bond is a non-metallic heteroatom (e.g., N, O, S) or a metalloid heteroatom (e.g., B). In some embodiments, the redox active component is a conjugated hydrocarbon, a conjugated amine, a conjugated thioether, an organodisulfide, a thioether, a compound comprising a nitroxyl radical, or a conjugated carbonyl (e.g., a quinone). In some embodiments, the redox active component is selected from a quinoxaline compound (e.g., a quinoxaline compound bearing at least one electron-donating substituent), a dipyridyl ketone compound, a viologen compound (e.g., a bis-benzyl viologen salt, an ethyl viologen salt, and the like), and a benzophenone compound. In some embodiments, the redox active component is selected from a 1,4-dialkoxybenzene compound (e.g., a 2,5-di-tert-butyl-1,4-dialkoxybenzene compound), a phenothiazine compound, a catechol ether compound, a catecholborane compound (e.g., a halogenated 5-phenyl-1,3,2-benzodioxaborole compound), a borane cluster compound (e.g., a halogen-substituted $B_{12}$ borane compound), a 1,3 benzodioxole compound (e.g., a 4,6-di-tert-butyl-1,3-benzodioxole), a benzodioxin compound (e.g., a 5,7-di-tert-butyl-benzodioxin), a 1,4-dialkoxy-2,5 bisphosphinyl benzene compound, a 1,4-phenylene diphosphate ester compound (e.g., a 2,5-di-tert-butyl-1,4-phenylene diphosphate ester), and a phenazine compound.

In some embodiments, the redox active composition comprises a metal coordination cation coordinated to a number of redox-active ligands and an anion. The metal coordination cation can comprise any transition metal ion, such as iron, copper, or manganese. The redox-active ligands can comprise an aminoalcohol and/or a dialcoholamine. The alkyl group of the alcohol can vary. For example, the aminoalcohol can comprise ethanolamine, butanolamine, hexanolamine, etc. A variety of redox-active species can be attached to or contained in the ligands. Many metallocenes, such as ferrocene, can be used. Also, transition metals coordinated to bypyridine groups can be used, such as tris(2,2'-bipyridine)nickel(II) or tris(2,2'-bipyridine)iron(II). Other families of redox-active species, such as quinones, (2,2,6,6-tetramethyl-piperidin-1-yl)oxyl (TEMPO), aniline, or methylviologen, can also be attached to the ligand. For example, the anion can comprise iodide, ferricyanide, polyoxometallate, or peroxosulfate.

In some embodiments, the redox active component is selected from the group including, but not limited to, anisole, 4,4'-dimethyoxybiphenyl, 2,5-di-tertbutyl-1,4-dimethoxybenzene, 2,5-di-tert-butyl-1,4-bis(2-methoxyethoxy) benzene (DBBB), polyaniline, (2,2,6,6-tetramethylpiperidin-1-yl)oxy (TEMPO), a metallocene (e.g., ferrocene, nickelocene, cobaltocene), 9,10-anthraquinone-2,7-disulfonic acid, tetracyanoquinodimethane (TCNQ), 1,8-dicyrosy-9,10-anthraquinone-2,7-disulfonic acid, quinoxaline, poly(2,5-dimercapto-1,3,4-thiadiazole), N-methylphthalimide, pyrene-4,5,9,10-tetraone, benzoquinone, phenanthraquinone, napthoquinone, anthraquinone, 1,4,5,8-naphthalenetetracarboxylic dianhydride, 3,4,9,10-perylenetetracarboxylic dianhydride, 1,5-bis(2-(2-(2-methoxyethoxy)ethoxy)ethoxy)-anthracene-9,10-di one, poly(anthraquinonyl sulfide), pyromellitic anhydride, trans, trans-muconate, terephthalate, 4,4-tolane-dicarboxylate, a metal bipyridine complex (e.g., tris(bipyridine) ruthenium, ([$Ru(bpy)_3$)])), and a metal acetylacetonate (e.g., vanadium acetylacetonate ($V(acac)_3$) or chromium acetylacetonate (Cr ($acac)_3$)). In some embodiments, the first and/or second redox composition comprise a metallocene. In some embodiments, the metallocene is ferrocene.

In some embodiments, the RFB can be charged by applying a potential difference across the positive and negative electrode, and the first redox active composition comprises a component that is oxidized and the second redox active composition comprises a component that is reduced. The RFB can be discharged by applying a potential difference across the positive and negative electrodes such that a component of the first redox active composition is reduced, and a component of the second redox active composition is oxidized.

In some embodiments, the presently disclosed subject matter provides an energy storage system comprising one or more RFBs comprising the presently disclosed IEM. In some embodiments, the presently disclosed subject matter provides a stack comprising two or more RFBs. In some embodiments, the system is connected to an electrical grid. In some embodiments, the presently disclosed subject matter provides a method of storing energy, wherein the method comprises the use of an RFB of the presently disclosed subject matter or an energy storage system thereof, e.g., wherein the method comprises charging one or more RFB.

V. Methods of Preparation

In some embodiments, the presently disclosed subject matter provides a method of preparing an ion conducting polymer of the presently disclosed subject matter, e.g., a modified PPO wherein a portion of the monomeric units of the PPO are modified by attachment of a sulfonate-substituted side chain (e.g., a sulfonate-substituted arylamine)

and/or a portion of the monomeric units of the PPO are modified by attachment of an oligomeric polyether-containing side chain.

In some embodiments, the method comprises: (a) contacting a polymer comprising or consisting of poly(2,6-dimethyl-1,4-phenylene oxide) with a free radical halogenation reagent in the presence of a free radical initiator in a first aprotic solvent, thereby forming a partially halogenated polymer; and (b) contacting the partially halogenated polymer with a sulfonated aminoarene in the presence of a catalyst and a base in a second aprotic solvent.

Free radical halogenation reagents include, for example, bromine ($Br_2$), chlorine ($Cl_2$), or iodine ($I_2$) in combination with heat or light, sulforyl chloride, and N-bromo-succinimide (NBS). In some embodiments, the free radical halogenation reagent is a free radical bromination reagent. In some embodiments, the free radical halogenation reagent is NBS. Free radical initiators include azo and peroxide compounds. In some embodiments, the free radical initiator is azobisisobutyronitrile (AIBN). The amount of free radical halogenation reagent and free radical initiator can be varied to obtain different degrees of halogenation. Typically, an excess of halogenation reagent is used for each modified monomeric unit desired. In some embodiments, to obtain about 9% modified monomeric units, the amount of free radical halogenation reagent (e.g., NBS) can be about 0.25 equivalents or less compared to the average number of monomeric units in the polymer. For halogenated PPOs with a higher degree of halogenation, a smaller excess of reagent can be used compared to the desired extent of halogenation. For example, in some embodiments, 50% bromination can be achieved using 0.6 equivalents of NBS compared to the average number of monomeric units in the polymer. In some embodiments, the amount of free radical halogenation reagent is about 0.10 equivalents to about 0.25 equivalents the number of monomeric units in the polymer. The number of moles of free radical initiator can be less than the number of moles of the halogenation reagents (e.g., about 0.1, 0.08, 0.06, or 0.04 the number of moles or less). In some embodiments, the free radical halogenation reaction can be performed under an increased temperature (e.g., about 60° C. or more, or about 80° C., about 100° C. or about 110° C.).

Any aprotic solvent in which the polymer is soluble can be used. In some embodiments, the first aprotic solvent is an aromatic solvent, e.g., benzene, toluene, or chlorobenzene. In some embodiments, the first solvent comprises or consists of chlorobenzene.

In some embodiments, the degree of halogenation is about 50% or less. In some embodiments, the degree of halogenation (e.g., bromination) of the partially halogenated polymer can be about 10% or less. In some embodiments, the degree of halogenation is about 2.4% to about 9.1%. In some embodiments, the degree of halogenation is about 4.6% to about 9.1% (e.g., about 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, or about 9.1%).

The partially halogenated polymer can be collected by any suitable means, e.g., precipitation with an alcohol (e.g., ethanol) followed by filtration. In some embodiments, the partially halogenated polymer can be purified. For example, in some embodiments, the partially halogenated polymer can be re-dissolved in an aprotic solvent, precipitated with an alcohol, and collected via filtration.

In some embodiments, the sulfonated aminoarene is a sulfonated aniline. In some embodiments, the sulfonated aminoarene is a sulfonated phenoxyaniline. In some embodiments, the sulfonated phenoxyaniline is POATS and the ion-conducting polymer is a POATS-PPO. The sulfonated aminoarene can be prepared, for example, via an aromatic sulfonation reaction, e.g., using sulfuric acid as the sulfonation reagent. The product of the aromatic sulfonation reaction can be purified, as desired, prior to reaction with the partially halogenated polymer. For example, the aromatic sulfonation reaction can be neutralized with a trialkylamine (e.g., triethylamine) and an alkaline earth carbonate (e.g., calcium carbonate ($CaCO_3$). The resulting sulfate (e.g., calcium sulfate) precipitate can be removed via filtration. The reaction product can be further purified via crystallization and optionally re-dissolved in water and recrystallized to remove any remaining sulfate or other inorganics.

In some embodiments, an excess of the sulfonated aminoarene is used (e.g., a 25% excess), e.g., to promote full conversion of the partially halogenated polymer. In some embodiments, the catalyst is sodium iodide. In some embodiments, the base, used to prevent acid build-up, is an alkali metal carbonate (e.g., potassium carbonate). In some embodiments, the second aprotic solvent comprises an aromatic solvent (e.g., chlorobenzene). In some embodiments, the second aprotic solvent comprises NMP. In some embodiments, the second aprotic solvent comprises chlorobenzene and NMP.

In some embodiments, the resulting modified polymer can be collected via precipitation in an alcohol (e.g., ethanol) and filtration or centrifugation. In some embodiments, the resulting modified polymer can be purified using any suitable polymer purification method known in the art. In some embodiments, the collected polymer can be purified by washing with an alcohol, followed by further centrifugation or filtration and drying.

Alternatively or additionally, in some embodiments, the partially halogenated polymer can be modified with a polyether-containing compound. For example, in some embodiments, the partially halogenated PPO can be contacted with an oligomer of an polyalkylene glycol, wherein the oligomer comprises terminal group (e.g., a hydroxy group or a primary amino group) capable of reacting with an alkyl halide (e.g., the brominated methyl group in a Br—PPO) and one terminal group that is not reactive or that is less reactive with the alkyl halide (e.g., an alkyl, aralkyl or aryl group, which can optionally include one or more charge group (e.g., in a protected form) or a group that can be reacted (optionally after a deprotection step) to form a bond with a group containing a charge group).

In some embodiments, the oligomer is a monohydroxy-terminated PEG oligomer, i.e., a compound of the formula HO—$(CH_2CH_2O)$s-R, wherein s is an integer between 2 and 10 (i.e., 2, 3, 4, 5, 6, 7, 8, 9, or 10) and R is selected from alkyl (e.g., methyl or ethyl), aralkyl (e.g., benzyl) and aryl (e.g., phenyl). In some embodiments, the monohydroxy-terminated PEG oligomer and the partially halogenated PPO are contacted in an aprotic solvent (e.g., tetrahydrofuran (THF)) in the presence of a strong base (e.g., to deprotonate the hydroxy group of the PEG oligomer), such as, but not limited to an alkali metal hydroxide (e.g., KOH, NaOH, or LiOH), or an alkali metal hydride (e.g., NaH, LiH, or KH). Thus, in some embodiments, the partially halogenated PPO is used to prepare a polyether-modified PPO (e.g., a PEGPE-PPO). In some embodiments, the partially halogenated PPO can be contacted first with a monohydroxy-terminated PEG oligomer in the presence of a strong base to add a polyether side chain to some of the PPO monomeric units by modifying some of the halogenated monomeric units in the partially halogenated PPO, and then the partially polyether-modified/partially halogenated PPO can be contacted with a sulfonated aminoarene in the presence of a catalyst and a base to add the sulfonated aminoarene at additional PPO monomeric units by modifying remaining halogenated monomeric units in the PPO.

In some embodiments, the polyether-containing compound is hydroxy- or amino-containing compound that further contains an oligomeric polyether chain. Such compounds include those that contain an oligomeric polyether diol chain capped on each end with a group selected from aralkyl, substituted aralkyl, aryl, and substituted aryl, wherein one of the capping groups is substituted by an amino group or a hydroxyl group. For example, the polyether-containing compound can be a compound such as 2-(2-(2-(2-methoxyphenoxy)-ethoxy-ethoxy-phenol (which is commercially available from Millipore Sigma (Burlington, Massachusetts, United States of America)), which comprises a diethylene glycol capped on one end with a methoxy-substituted phenyl group and on the other end with a hydroxy-substituted phenyl group. The hydroxy or the hydroxy-substituted phenyl group can react with a halo group in a partially halogenated PPO under reaction conditions similar to those described above for monohydroxy-terminated PEGS, e.g., using an aprotic solvent and a base, such as an alkali metal hydroxide (e.g., KOH, NaOH, or LiOH), or an alkali metal hydride (e.g., NaH, LiH, or KH) to provide a PPO with a side chain comprising a polyether group attached to the PPO backbone via a —O-phenylene-linker. Alternatively, the hydroxy terminal group can be catalytically converted to an amino group and/or one or both of the aryl rings of such a compound can be sulfonated via an aromatic sulfonation reaction.

In some embodiments, the polyether-containing compound is an oligomeric PEG or PPG diol. A halogenated or partially halogenated PPO (i.e., a Br—PPO) can be contacted with an excess of the PEG or PPG diol (i.e., an excess compared to the average number of halogenated monomeric units in the PPO) so that one of the hydroxyl groups in the PEG or PPG diol acts as a nucleophile and forms an ether linkage with the methyl group of a PPO monomeric unit by a substitution reaction where the halo group (e.g., Br) acts as a leaving group. This reaction can provide a PPO where a portion of the monomeric units comprise a polyether side chain comprising a hydroxyl terminal group (i.e., the remaining hydroxyl group from the PEG or PPG diol). This modified PPO can then by reacted with a halide of a desired terminal group, such as an alkyl halide or aralkyl halide, which can optionally be substituted with one or more sulfonate groups. For example, the halide can be $Br—CH_2CH_2—C_6H_4—SO_3H$ or $Br—CH_2—C_6H_4—SO_3H$, which would provide a sulfonate-substituted aralkyl terminal group to the polyether side chains. Conditions for reacting the modified PPO with the halide can again involve use of an aprotic solvent and a base (e.g., an alkali metal hydroxide or alkali metal hydride) to deprotonate the hydroxy group.

In some embodiments, the modified polymer (e.g., the POATS-PPO, PEGPE-PPO, or other modified PPO) can be re-dissolved in an aprotic solvent and a membrane of the polymer can be prepared by casting a membrane from the solution. In some embodiments, the solution can be cast into a mold or onto a flat surface and dried to remove the solvent. If desired, the counter-ion of any sulfonate groups in the polymer can be exchanged. In some embodiments, the counter-ion can be replaced by an alkali metal cation, e.g., $Li^+$ or $Na^+$, or the sulfonated groups can be protonated. Counter-ion exchange can be performed by soaking the membrane in a solution comprising an excess of the desired new counter-ion.

Accordingly, in some embodiments, the presently disclosed subject matter provides a method of preparing an IEM, the method comprising: (a) providing an ion conducting polymer of the presently disclosed subject matter, e.g., by the method described hereinabove; (b) dissolving the ion conducting polymer in an aprotic solvent; and (c) casting the solution (e.g., pouring the solution into a mold); and (d) drying the solution. In some embodiments, the ion conducting polymer of step (a) can be a mixture of different ion conducting polymers of the presently disclosed subject matter or a mixture of one or more ion conducting polymers of the presently disclosed subject matter and an unmodified PPO. In some embodiments, the aprotic solvent comprises an aromatic solvent (e.g., chlorobenzene). In some embodiments, the aprotic solvent comprises NMP. In some embodiments, the aprotic solvent comprises a mixture of chlorobenzene (or another aromatic solvent) and NMP. In some embodiments, the method further comprises performing ion exchange to exchange a counter-ion present in the ion conducting polymer (e.g., a trialkylammonium ion) with a different counter-ion or to protonate any sulfonate groups.

In some embodiments, the membrane can be crosslinked. For example, in some embodiments, a halogenated or partially halogenated PPO (e.g., Br—PPO) can be dissolved in the aprotic solvent in step (b). After step (c) (or after step (c) and any ion exchange) is performed, the membrane can be heated (e.g., to about 150° C.) for a period of time to perform crosslinking. The degree of crosslinking can be controlled by varying the amount or extent of halogenation of the halogenated or partially halogenated PPO. For instance, increased crosslinking can be achieved by increasing the amount of halogenated or partially halogenated PPO dissolved in the aprotic solvent and/or by increasing the extent of halogenation in a partially halogenated PPO. In some embodiments, the membrane is cast from a solution comprising between about 5 weight % and about 50 weight % (e.g., about 5, 10, 15, 20, 25, 30, 35, 40, 45, or about 50 weight %) of a halogenated or partially halogenated PPO (e.g., Br—PPO). In some embodiments, the halogenated or partially halogenated PPO has an extent of halogenation of about 5% to about 100%. In some embodiments, the extent of halogenation is about 5% to about 50%. In some embodiments, the extent of halogenation is about 5% to about 25%.

EXAMPLES

The following Examples provide illustrative embodiments. In light of the present disclosure and the general level of skill in the art, those of skill will appreciate that the following Examples are intended to be exemplary only and that numerous changes, modifications, and alterations can be employed without departing from the scope of the presently disclosed subject matter.

Example 1

Phenoxyaniline Trisulfonate (POATS) Synthesis

POATS was synthesized by the aromatic sulfonation of phenoxyaniline. The procedure was adapted from a previous report[32] and is shown schematically in Scheme 2, below. Briefly, in an ice bath, 15 mL fuming sulfuric acid (20% free $SO_3$ basis, Sigma Aldrich, St. Louis, Missouri, United States of America) was added slowly to a flask containing 2.0 g of 4-phenoxyaniline (97%, Sigma Aldrich, St. Louis, Missouri, United States of America). After the phenoxyaniline dissolved, the temperature was raised gradually to 80° C. over 30 minutes. After two hours at 80° C., the solution was poured over 80 g of ice prepared from deionized (DI) water (18.2 Ωcm, from a water purification system sold under the tradename DIRECT-Q 3 UV, Merck, Darmstadt, Germany) and then diluted to a total volume of 500 mL using DI water. The triethylammonium cation was added to the solution as 4.5 mL triethylamine (>99%, TCI America, Montgomeryville, Pennsylvania, United States of America), and then calcium carbonate (>99%, Sigma Aldrich, St. Louis, Missouri, United States of America) was added until the solution became neutral. The precipitated calcium sulfate was removed by filtration, and the solution was dried in a rotary evaporator to obtain a crystalized product. The solids were re-dissolved in 10 mL DI water, boiled, and filtered to remove additional calcium sulfate and calcium carbonate precipitates. The POATS product was dried in a convection oven at 80° C. and stored in a dry box until use.

Scheme 2. POATS synthesis.

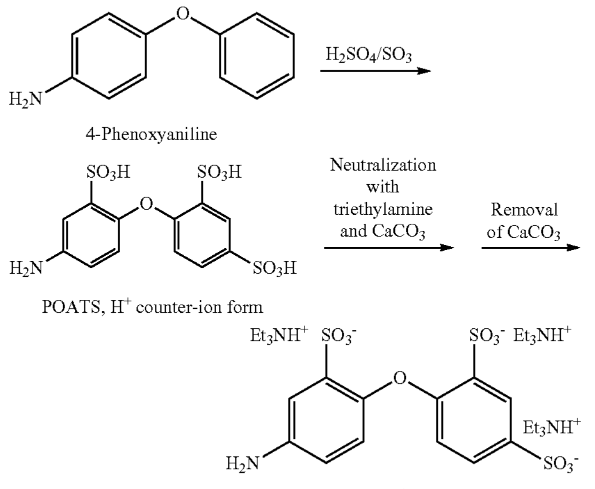

4-Phenoxyaniline

POATS, $H^+$ counter-ion form

POATS, $TEA^+$ counter-ion form

Thermogravimetic analysis (TGA) was performed using a TGA Q50 (TA Instruments, Inc., New Castle, Delaware, United States of America) to determine the amount of inorganic material in the POATS samples. A target of 20 mg of sample material was placed in the instrument, and the temperature was ramped to 120° C. at a rate of 20° C. $min^{-1}$ and subsequently held at 120° C. for 45 minutes to dry the sample. Then, the temperature was increased to 800° C. at a rate of 10° C. $min^{-1}$ under air, to burn away the organic component of the sample. The remaining mass at 800° C. was taken to be the inorganic material present in the POATS. This mass was normalized with the sample mass at the end of the drying step to obtain the mass fraction of inorganic material in the dry POATS.

Example 2

Brominated-Poly(Phenylene Oxide) Synthesis

As shown in Scheme 3, below, poly(2,6-dimethyl-1,4-phenylene oxide) was brominated using a free radical reaction to produce Br—PPO.[22] The bromine source was N-bromo-succinimide (NBS, 99%, Sigma Aldrich, St. Louis, Missouri, United States of America), and the initiator was azobisisobutyronitrile (AIBN, 98%, Sigma Aldrich, St. Louis, Missouri, United States of America). A typical reaction recipe was 6.0 g of the polymer (50 meq PPO repeat units, powder (SKU 181781), Sigma Aldrich, St. Louis, Missouri, United States of America), 2.23 g NBS (12.5 mmol), and 0.125 g AIBN (0.75 mmol). All reactants were dissolved in 75 mL chlorobenzene (Thermo Fisher Scientific, Waltham, Massachusetts, United States of America) at room temperature, placed in an oil bath, and heated at 110° C. for 1 hour. The solution subsequently was cooled to room temperature in a water bath, and the Br—PPO was precipitated in 10-fold excess reagent alcohol (Thermo Fisher Scientific, Waltham, Massachusetts, United States of America) and collected via filtration. Then, the polymer was dried, re-dissolved in 50 mL chloroform (ACS reagent), and collected again by precipitation in reagent alcohol and filtration. Finally, the Br—PPO was dried under vacuum and stored until use. Although 25% bromination was theoretically possible with these example amounts, the reaction yielded an approximately 9% brominated product. The NBS and AIBN amounts were scaled to obtain different degrees of bromination.

Scheme 3: Bromination of PPO to form Br-PPO.

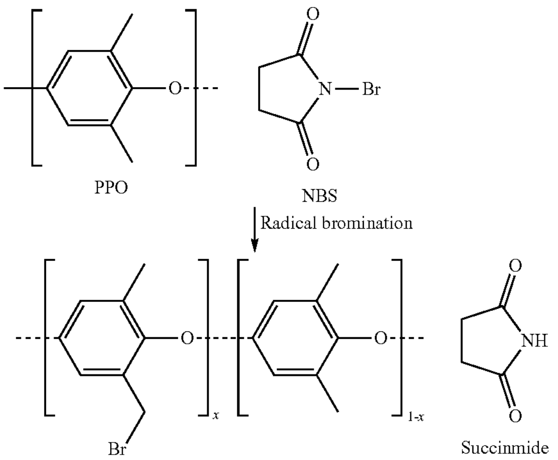

PPO

NBS

Br-PPO-x

Succinmide

Proton nuclear magnetic resonance ($^1H$-NMR, Varian 600 MHz) spectroscopy was performed using DMSO-d6 (min. 99.8% deuterated, Millipore) as the solvent for POATS and using $CDCl_3$ (99.8% deuterated, Cambridge Isotope Laboratories) as the solvent for Br—PPO. For each measurement, 10 mg of sample was dissolved in 700 μL of the deuterated solvent.

Example 3

Membrane Synthesis

As shown in Scheme 4, below, Br—PPO was reacted with POATS to convert Br—PPO to POATS-PPO. To protect the reaction from water contamination, all materials and glassware initially were dried under vacuum. First, 0.3 g Br—PPO and 25% excess POATS were dissolved separately in 6 mL chlorobenzene and 12 mL anhydrous N-methyl-2-pyrrolidone (NMP, anhydrous, 99.5%, Sigma Aldrich, St. Louis, Missouri, United States of America), respectively.

The solutions were added together into a two-necked flask along with 10 mg NaI (>99%, Sigma Aldrich, St. Louis, Missouri, United States of America) and 100% excess $K_2CO_3$ (>99%, Sigma Aldrich, St. Louis, Missouri, United States of America). The flask was placed in a 70° C. oil bath, and the reaction was allowed to proceed for 1 hour under a dry nitrogen blanket. The polymer was precipitated in 150 mL of reagent alcohol, collected using a centrifuge, washed with a further 150 mL of reagent alcohol, collected again with a centrifuge, and dried under vacuum. Membranes were cast by dissolving 0.15 g of POATS-PPO in a mixture of 6 mL NMP and 3 mL chlorobenzene, casting this solution in a 6.5 cm diameter circular PTFE mold, and then drying the membranes for 16 hours in a convection oven at 70° C. followed by 24 hours under vacuum at 80° C. Membranes were lithiated (i.e., exchanged into the lithium counter-ion form) by soaking each membrane in 100 mL of aqueous 1 M LiCl (>99%, Sigma Aldrich, St. Louis, Missouri, United States of America) solution for 24 hours at 80° C. The LiCl solution was replaced with fresh solution after the first 4 hours of the soaking process.

Scheme 4. Preparation of POATS-PPO and conversion to the lithium counter-ion form.

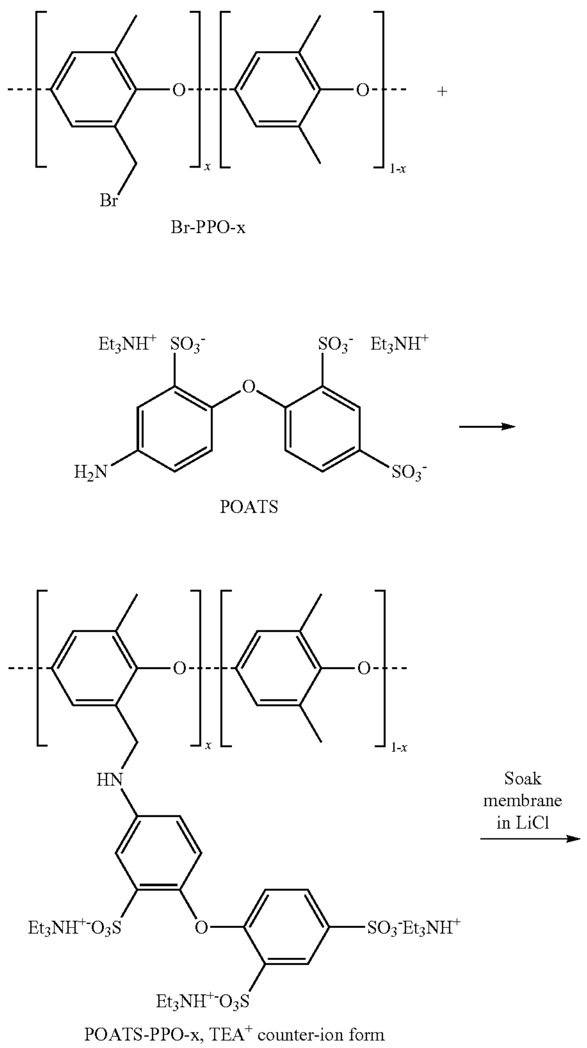

Br-PPO-x

POATS

POATS-PPO-x, $TEA^+$ counter-ion form

-continued

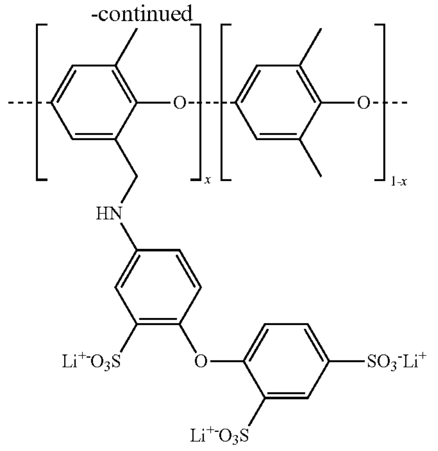

POATS-PPO-x, $Li^+$ counter-ion form

TGA indicated that the membranes do not have significant mass loss or decomposition until about 400° C.

Two membranes were prepared for use as control samples in studying the presently disclosed modified PPO membranes using sulfonated tetrafluoroethylene-based fluoropolymer-copolymers sold under the tradename NAFION® (Chemours Company, Wilmington, Delaware, United States of America).

For the control membrane referred to herein as "Neon® 117", the copolymer sold under the tradename NAFION® 117 (Chemours Company, Wilmington, Delaware, United States of America) was pretreated and converted to the lithium counter-ion form using a previously reported procedure.[16] First, the membrane was soaked in 3 wt % 11202 (ACS reagent, Sigma Aldrich, St. Louis, Missouri, United States of America) for 1 hour at 80° C. The membrane then was soaked in aqueous 0.25 M $H_2SO_4$ (ACS reagent, Sigma Aldrich, St. Louis, United States of America) at 80° C. for 1 hour. Next, the membrane was lithiated by soaking the membrane in aqueous 0.25 M LiOH (Laboratory grade, Thermo Fisher Scientific, Waltham, Massachusetts, United States of America) at 80° C. for 1 hour. Finally, the membrane was soaked in 80° C. DI water 3 times for 30 minutes each time. The membrane was dried first in a convection oven at 80° C. for 6 hours and then under vacuum at 80° C. overnight for approximately 16 hours.

The control membrane referred to herein as "Nafion®/PVDF" was prepared according to a previously reported procedure.[20] The polymers sold under the tradenames NAFION® 117 and NAFION® 212 (Chemours Company, Wilmington, Delaware, United States of America) have the same ion exchange capacity (IEC) and differ only in casting methods and thickness.[33,34] Thus, for this second control membrane, the polymer sold under the tradename NAFION® 212 was used to increase surface area and accelerate dissolution. First, the NAFION® 212 and PVDF powder were dried under vacuum for 24 hrs. After drying, 350 mg of NAFION® 212 was cut into small pieces, heated, and dissolved in 10 mL N,N'-dimethylformamide (>99%, Sigma Aldrich, St. Louis, Missouri, United States of America) at 80° C. in an oil bath. This process typically required 6 hours. Then, an equal mass (350 mg) of PVDF (Kureha Corporation, Tokyo, Japan) was dissolved in the solution, and the mixture was left stirring in an 80° C. oil bath for 16 hours to fully mix. The membrane was cast in a 10 cm diameter circular PTFE mold and dried at 80° C. for 12 hours followed by 120° C. for 24 hours. The membrane was hydrated with DI water and peeled from the mold. The membrane was lithiated by first soaking the membrane in 300 mL of 80° C. aqueous 0.5 M $H_2SO_4$ for 2 hours followed by 300 mL of 80° C. aqueous 1 M LiOH for 2 hours. The membrane was then soaked in 300 mL of 80° C. DI water three times for 30 minutes each time. Finally, the membrane was dried in a convection oven at 80° C. 24 hours. Membranes were stored in a dry box until use.

Example 4

Ion Exchange Capacity

The ion exchange capacity (IEC) of the membranes was determined using a titration method. Due to the low swelling and possible chemical instability of the membranes under highly acidic conditions, relatively low concentrations of acid and salt were used.[35] First, membranes were dried under vacuum for at least 24 hours at 80° C. and weighed. Next, the membranes were soaked in 0.1 M HCl (ACS reagent, Sigma Aldrich, St. Louis, Missouri, United States of America) for 6 hours at room temperature. Then, they were soaked in DI water twice for 30 minutes each time, and finally, they were soaked in 0.1 M $CaCl_2$ (ACS reagent, Amresco LLC, Solon, Ohio, United States of America) solution for 16 hours. The membranes were removed, and the $CaCl_2$ solutions were titrated using bromothymol blue (Sigma Aldrich, St. Louis, Missouri, United States of America) as an indicator and 0.100 M NaOH (ACS reagent) as the titrant. The number of moles of acid in solution was assumed to correspond to the number of equivalents of fixed charge (i.e., sulfonate) groups in the membrane. Then, the IEC was determined by dividing the milliequivalents of fixed charge groups by the dry mass, in g, of the polymer used in the titration.

Example 5

Solvent Uptake

To determine solvent uptake, membranes first were dried in an 80° C. vacuum oven for 48 hours. The dry mass was recorded, and the samples were immersed in the non-aqueous electrolyte, 1 M LiFSI (Nippon Shokubai, Osaka, Japan) in DMC (99+%, extra dry, Acros Organics, Fair Lawn, New Jersey, United States of America), or in DI water for 3 days at room temperature. The samples were wiped, to remove surface liquid, and weighed quickly to determine the solvated sample mass. Solvent uptake was expressed as the percentage increase in mass between the dry membrane and the solvated membrane normalized by the dry membrane mass. To ensure this mass was representative of the equilibrium solvent uptake and to characterize the dimensional stability of the polymers, some membranes were returned to the solvent and left there for 4 months, and no additional mass change was observed.

Example 6

Ionic Conductivity

Ionic conductivity was measured using electrochemical impedance spectroscopy (EIS, SP 150, BioLogic USA, LLC, Knoxville, Tennessee, United States of America).[16] The measurement was performed by placing the membrane between two halves of a glass cell with a cross-sectional membrane area of 4.52 $cm^2$ that was subsequently filled with electrolyte (1 M LiFSI in DMC or 1M LiCl in DI water). Custom aluminum electrodes, which spanned the cross-section of the cell, were inserted on both sides of the membrane, and the impedance response was measured from 1 MHz to 1 kHz with a voltage amplitude of 20 mV and 10 points per decade. The resulting data were fit using a model circuit to obtain the high frequency intercept. The resistance associated with this intercept, $R_1$, was the sum of the membrane, solution, and cell resistances, which were all in series. The test was repeated with no membrane present in the cell to determine the contribution of the solution and cell resistances, $R_{1,Blank}$, which was assumed to be constant for a given electrolyte. The conductivity of the membrane, a, in mS $cm^{-1}$ was calculated as:

$$\sigma = 1000 * \frac{L}{A(R_1 - R_{1,Blank})} \quad (1)$$

where A was the cross-sectional area of the cell in $cm^2$ and L was the membrane thickness in cm.

Example 7

Ferrocene Permeability

Ferrocene permeability was determined using a two-chamber glass cell with 1 M LiSFI and 0.1 M ferrocene (98%, Acros Organics, Fair Lawn, New Jersey, United States of America) in DMC in one half and 1 M LiFSI in DMC in the other. The two chambers were separated by the membrane. Ferrocene concentration in the receiving chamber was measured using ultraviolet-visible (UV-Vis) spectroscopy, taking advantage of the unique ferrocene absorbance peak at 442 nm.[20] The magnitude of this peak has a linear relationship with concentration up to at least 10 mM, which was higher than any concentrations observed in the cell chamber of interest during permeability measurements. The solutions in both chambers were stirred, and over the course of two weeks, the receiving chamber solution was removed, the ferrocene concentration was measured using UV-Vis spectroscopy, and then the solution was returned to the chamber. This process was performed three times over the two-week period to obtain the change in the concentration of ferrocene in the receiving chamber solution over time. Plotting those data versus time resulted in a linear relationship, and ferrocene permeability, P, in $cm^2$ $s^{-1}$, was calculated as:

$$V_l \frac{dC_2}{dr} = \frac{AP}{L}(C_1 - C_2) \quad (2)$$

where $V_1$ was the liquid volume of the receiving cell in mL, A was the cross-sectional area of the membrane in $cm^2$, L was the thickness of the membrane in cm, $C_1$ was the ferrocene concentration in the donor chamber, and $C_2$ was the time-dependent ferrocene concentration in the receiving chamber.

Example 8

Electrochemical Stability of POATS-PPO Membranes

The electrochemical stability of the membranes was tested using cyclic voltammetry (CV). The measurement was made by assembling a 2032-type coin cell using a POATS-PPO-6.6 membrane as a representative POATS-PPO-type material. The membrane was soaked in electrolyte (1 M LiFSI in DMC) for 24 hours prior to use as the separator in a coin cell. Lithium foil was used as a combination counter/reference electrode and stainless steel was used as the working electrode. A cell was assembled for comparison where the only difference was that a Celgard 2325 separator (Celgard LLC, Charlotte, North Carolina, United States of America) was substituted for the POATS-PPO membrane. It is noted that in both cells the membrane was in direct contact with both the lithium foil and the stainless steel. The CV sweeps were done from 2.0 V to 4.5 V vs $Li/Li^+$ at 50 mV $s^{-1}$ for 3 cycles. No features were observed in the CV that suggested oxidation or reduction of POATS-PPO membrane constituents and the current densities at all potentials in the POATS-PPO coin cell were lower than those in the cell with the Celgard membrane, suggesting that POATS-PPO membranes were electrochemically stable within the relevant potential window.

Example 9

Results and Discussion

Membrane Composition

Figure 6:
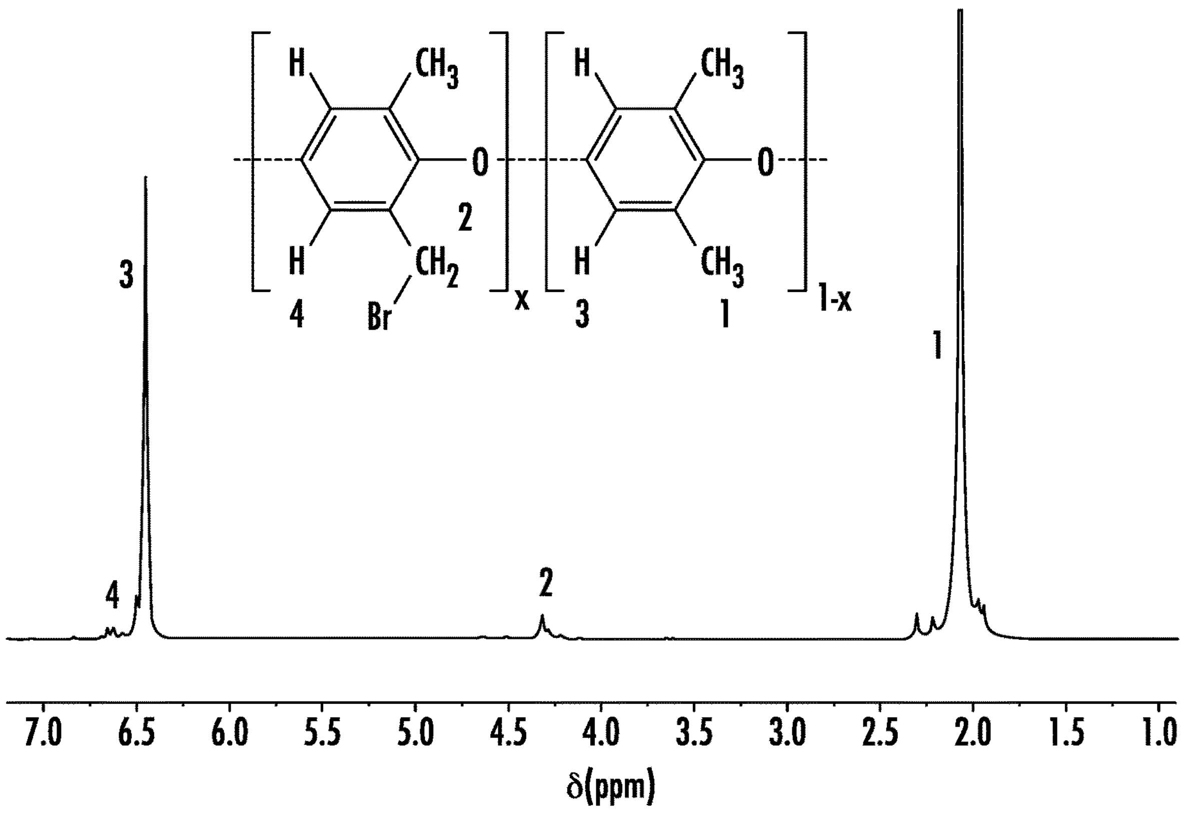
FIG. 6 is a graph showing a representative proton nuclear magnetic resonance (NMR) spectrum of brominated poly(2,6-dimethyl-1,4-phenylene oxide) taken in deuterated chloroform.

POATS-PPO membranes were prepared using Br—PPO as an intermediate. Thus, the final degree of POATS substitution was controlled by the Br—PPO degree of bromination (DB), i.e., the percentage of brominated repeat units. The DB was measured using $^1$H-NMR spectroscopy. A representative NMR spectrum is shown in FIG. 6. Peaks at 2.1 and 6.5 ppm were attributed to the aliphatic and aromatic hydrogens, respectively, on the PPO backbone with no bromine present.[22,26] The chemical shifts attributed to these hydrogens change to 4.3 and 6.7 ppm, respectively, with the addition of bromine to one methyl group of the PPO repeat unit. No peak was observed at 6.1 ppm, which indicated that bromine did not substitute at an aromatic position on the PPO repeat unit.[22,26] The DB was calculated using the ratio of the integrated 4.3 and 2.1 ppm peaks as:

$$DB = \frac{2}{1 + \frac{2}{3} * \frac{\text{Peak (4.3 ppm)}}{\text{Peak (2.1 ppm)}}} * 100\% \qquad (3)$$

The aliphatic hydrogen peaks were used to determine the DB due to their greater intensity and separation compared to the aromatic peaks.

The upper and lower limits for the extent of PPO bromination and subsequent functionalization with POATS were limited by the mechanical properties of the resulting membranes. The POATS-PPO membranes made with a DB greater than 9.1% became brittle when the membrane was dry. As such, these membranes generally cracked during film casting. POATS-PPO membranes made with a DB less than 4.6% had a different physical appearance. For example, they were lightly opaque instead of clear, and they became brittle when exposed to organic solvents, in contrast to higher DB polymers that became more flexible when exposed to organic solvents. Polymers were synthesized with DBs of 4.6%, 6.3%, 7.2%, and 9.1%.

Figure 7:
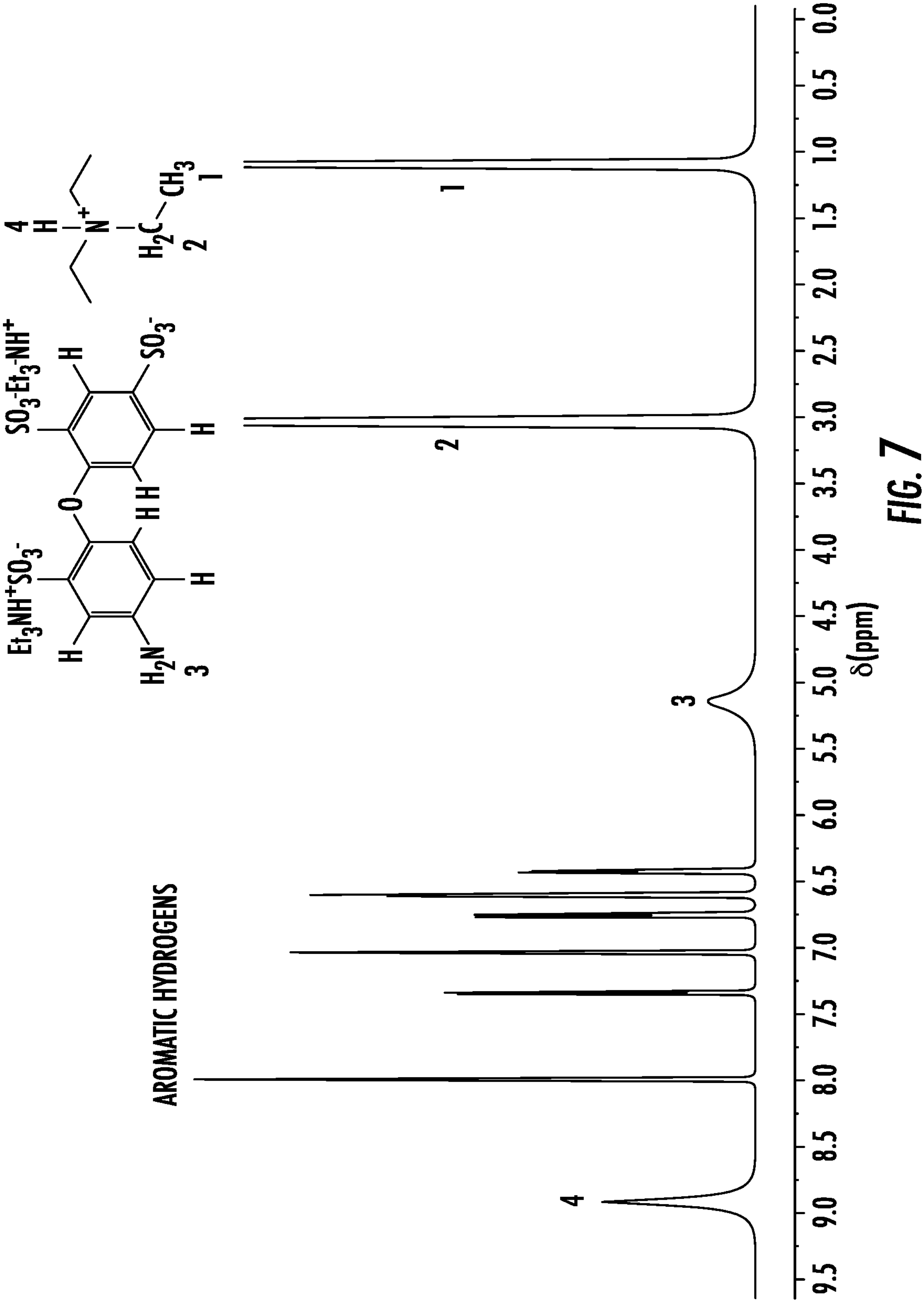
FIG. 7 is a graph showing the proton nuclear magnetic resonance (NMR) spectrum of phenoxyaniline trisulfonate (POATS).

The number of sulfonate groups added to the phenoxyaniline during the aromatic sulfonation was initially unknown, thus the structure of POATS was determined using $^1$H-NMR spectroscopy. See FIG. 7. Broad peaks at 5.1 and 8.9 ppm result from protons bound directly to nitrogen in the aromatic amine group of the POATS molecule and in the quaternary amine of the triethylammonium cation respectively.[32] The ethyl groups of the triethylammonium also contributed peaks at 1.1 and 3.0 ppm. The remaining six sharp peaks in the 6.3-8.0 ppm region were attributed to the aromatic hydrogens on the POATS molecule.[32] When the peak integrations were normalized using one of the aromatic hydrogen peaks, all six peaks in this region have an integration of approximately 1. This result indicated that each peak only represented one hydrogen. As such, these NMR results were consistent with the presence of six aromatic hydrogens per POATS molecule, which indicates the presence of three sulfonate groups per POATS molecule. The amount of triethylammonium also suggested the presence of three sulfonate groups per POATS molecule. The peak integrations of the ethyl group hydrogen peaks were 26.3 and 17.8. These values were close to the peak integrations of 27 and 18 expected in a situation where three sulfonate groups, fully converted to the triethylammonium cation form, were present on each POATS molecule.

TGA was used to confirm that the inorganic salts used in the purification procedure were removed. The POATS product was heated in air to burn off the organic components. The residual mass, which was taken to be the inorganic matter, was measured to be less than 1% of the initial dry polymer mass. This result indicated that the calcium sulfate and calcium carbonate were successfully removed during the POATS purification process.

The final POATS-PPO polymers were insoluble in a range of deuterated solvents, so $^1$H-NMR spectroscopy could not be used to determine the amount of POATS added to each polymer. Rather, the ion exchange capacity (IEC) of the polymer was measured to provide quantitative insight into the extent of sulfonation. A comparison of the measured and theoretical IEC values is provided in Table 1, below. The theoretical IEC was calculated using the DB of the starting Br—PPO and assumed complete substitution of bromine by POATS. The measured IEC values were generally 25% to 32% lower than the theoretical IEC values. Neither a longer reaction time nor a larger excess of POATS increased the measured IEC, suggesting that the extent of the POATS functionalization reaction had reached its limit.

TABLE 1

Comparison of the theoretical and measured IEC values.

| Sample | Theoretical IEC[a] (meq g dry polymer$^{-1}$) | Measured IEC[b] (meq g dry polymer$^{-1}$) |
|---|---|---|
| POATS-PPO-4.6 | 0.99 | 0.75 ± 0.01 |
| POATS-PPO-6.3 | 1.29 | 0.96 ± 0.01 |
| POATS-PPO-7.2 | 1.43 | 1.08 ± 0.04 |
| POATS-PPO-9.1 | 1.72 | 1.17 ± 0.06 |

[a]The theoretical IEC was calculated using the degree of bromination, measured using $^1$H-NMR and the assumption of full Br-PPO conversion to POATS-PPO.
[b]Measured IEC was determined from titration data and reported as the average of three samples (with the uncertainty taken as one standard deviation from the mean).

The observed difference between theoretical and measured IEC values was not unprecedented, and similar differences have been reported for PPO-based polymers containing a charged side chain.[25] Without being bound to any one theory, these differences between theoretical and measured IEC values are believed to be a consequence of the titration-based IEC measurement. If some fraction of the sulfonate groups were embedded in the otherwise hydrophobic polymer matrix, those charged groups can be effectively inaccessible (and thus not measured) during the titration-based IEC measurement. This situation, which has been observed in other sulfonated polymers[36], would result in a measured IEC that was lower than the theoretical IEC.

Membrane Dimensional Stability and Electrolyte Uptake

To be viable for organic flow battery applications, it is desirable that membranes be dimensionally stable while in contact with non-aqueous (organic) electrolytes (e.g., 1 M LiFSI in DMC) for an extended period of time. Dimensional stability was quantified by measuring solvent uptake. Organic electrolyte uptake was measured as a function of time, and the solvent uptake, for all the membranes considered, generally stabilized after about 12 hours. This stabilized value did not significantly change over a subsequent four months of immersion. These results provided evidence that the membranes were chemically and dimensionally stable in the electrolyte, addressing an issue reported for other membranes in organic solvents.[37]

Films cast from unfunctionalized PPO were mechanically robust in the dry state, but weakened and became more brittle when exposed to DMC solvent. In contrast, the POATS-PPO membranes became more flexible upon exposure to DMC. Previous PPO functionalization studies have reported that, while unfunctionalized PPO forms a semi-crystalline polymer, functionalized PPO often becomes amorphous and, in some cases, has a lower glass transition temperature than unfunctionalized PPO.[23,38,39] Without being bound to any one theory, it is believed that the crystalline domains in unfunctionalized PPO can restrict the ability of the polymer to swell in DMC, and the additional tension on the polymer chains in this situation can cause unfunctionalized PPO to become more brittle upon exposure to DMC. A reduction in crystallinity upon functionalizing PPO can remove this source of chain tension and explain the observation that the presently disclosed POATS-PPO materials were more flexible than the unfunctionalized PPO polymer upon exposure to DMC. The presently disclosed POATS-PPO membranes were mechanically stable in contact with all solvents used, which facilitated further characterization of ionic conductivity and ferrocene permeability.

Figure 2A:
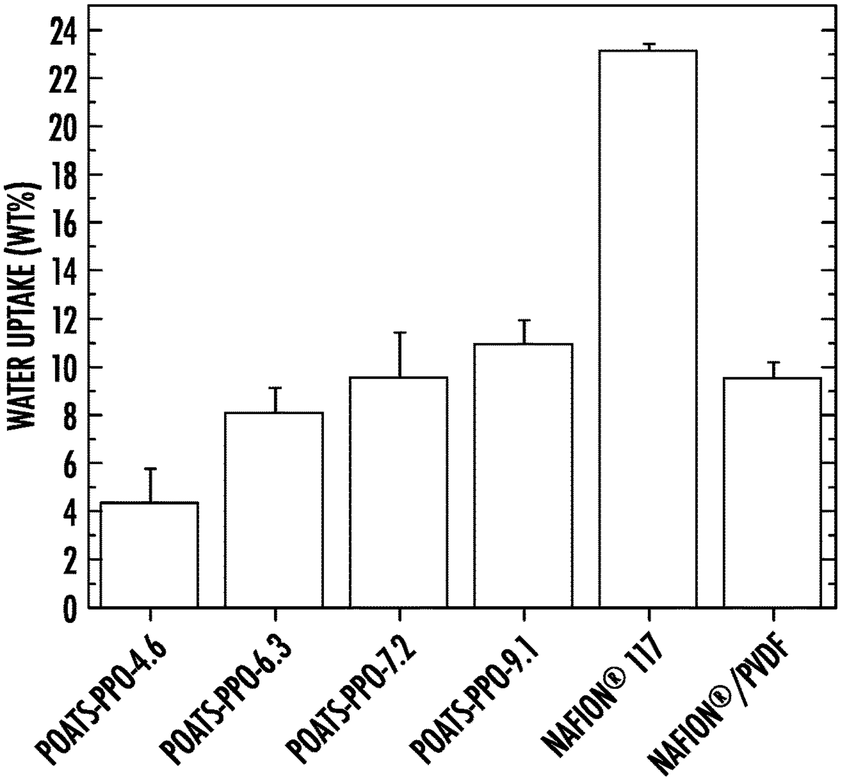
FIGS. 2A and 2B are a pair of graphs showing mass uptake (weight percent (wt %)) measured after 3 days using modified poly(phenylene oxide) (PPO) membrane samples initially equilibrated in deionized (DI) water (FIG. 2A) and 1 molar (M) lithium bis(fluorosulfonyl)imide (LiFSI) in dimethyl carbonate (DMC) (FIG. 2B). The modified PPO membrane samples contain different percentages of a phenoxyaniline trisulfonate (POATS) modified monomeric unit (4.6%, 6.3%, 7.2%, or 9.1% modified monomeric unit). Also shown for comparison is mass uptake in a control membrane prepared from an unmodified sulfonated tetrafluoroethylene-based fluoropolymer copolymer ("Nafion® 11T"; sold under the brand name NAFION®, Chemours Company, Wilmington, Delaware, United States of America) and in a control membrane prepared from a mixture of a sulfonated tetrafluoroethylene-based fluorocopolymer and polyvinylidene difluoride (PVDF) ("Nafion®/PVDF"). Longer tests of up to 4 months showed negligible change in swollen sample mass and, thus, uptake. Data are reported as the average of three measurements. The uncertainty was taken as one standard deviation from the mean of the three measurements.

Water uptake by the POATS-PPO membranes (see FIG. 2A) was similar to other PPO-based IEMs reported in literature,[21,22,25] and water uptake increased with increasing IEC. The relationship between water uptake and IEC was generally consistent with observations reported for a wide range of charged polymers.[40] The POATS-PPO water uptake, however, was relatively low compared to that of the control membranes used in the present studies. The first control membrane (i.e., the "Nafion® 117"), which had been pretreated and converted to the lithium counter-ion form, had more than double the water uptake of any POATS-PPO membrane. The second control membrane (i.e., the "Nafion®/PVDF"), also in the lithium counter-ion form, had approximately the same water uptake as POATS-PPO-7.2 even with an IEC less than half that of POATS-PPO-7.2 (0.45 compared to 1.08 meq g dry polymer). This phenomenon was observed and reported previously and was attributed to a greater separation of the hydrophilic and hydrophobic domains in perfluorinated polymers compared to hydrogenated polymers.[4]

Figure 2B:
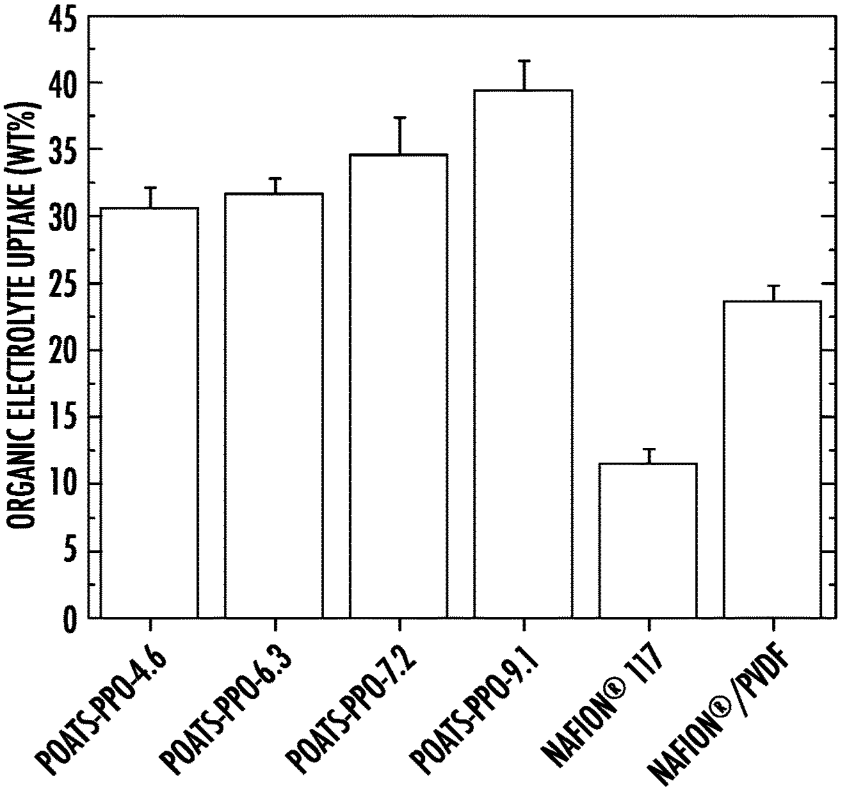

Solvent uptake significantly changed when the solvent was switched from water to the organic electrolyte. See FIG. 2B. The solvent uptake of the "Nation®117" control membrane decreased while all other polymers had increased solvent uptake. Without being bound to any one theory, this difference in behavior can be caused by the interactions of the solvent with the polymer backbones. Unfunctionalized PPO did not sorb a detectable amount of water but did swell by 29.5 wt % in organic electrolyte, which indicated that PPO has a significantly higher affinity for DMC compared to water. In contrast, polytetrafluoroethylene (PTFE), which forms the backbone of NAFION® polymers does not noticeably swell when exposed to either DMC or water. This difference in solvent affinity for the polymer backbone could explain why the organic electrolyte uptake increased compared to the aqueous electrolyte for the POATS-PPO membranes, but decreased for the "Nation®117" control membrane. Similarly, a pure PVDF film does not uptake water but swells by about 17 wt % in DMC, which could contribute to the increased swelling of the "Nafion®/PVDF" control membrane in organic electrolyte compared to aqueous electrolyte.

Ionic Conductivity

Figure 3:
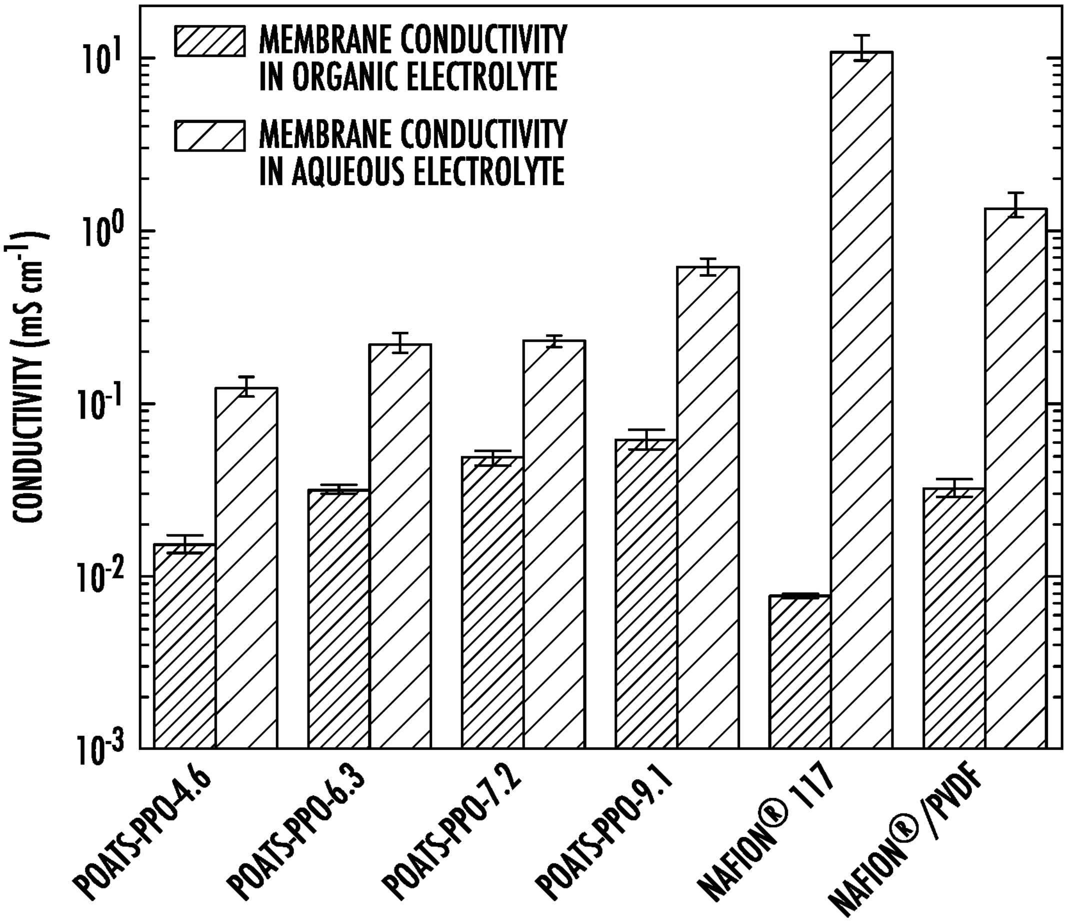
FIG. 3 is a graph showing the through-plane ionic conductivity (measured in millisiemens per centimeter (mS $cm^{-1}$)) of the membranes described for FIGS. 2A and 2B. The values were measured with the membranes immersed in either aqueous electrolyte (1 molar (M) lithium chloride (LiCl), black shaded bars) or organic electrolyte (1 M lithium bis(fluorosulfonyl)imide (LiFSI) in dimethyl carbonate (DMC), grey shaded bars). Data are reported as the average of three measurements. The uncertainty was taken as one standard deviation from the mean of the three measurements.

Ionic conductivities of membranes were measured while immersed in either water or DMC based electrolytes (see FIG. 3), with LiCl and LiFSI, respectively, as the added salts. Membrane conductivity was presumed to be largely a result of $Li^+$ transport because cation transference numbers through negatively charged polymers have been reported to be above 0.8.[42,43] The POATS-PPO ionic conductivity (in both water and DMC) increased as the IEC of the polymer increased. This result was consistent with generally observed properties of charged polymers.[25,26] Despite the significantly lower water uptake compared to DMC uptake, the POATS-PPO membranes had about an order of magnitude higher conductivity in water than in DMC. This result may be explained by the higher ionic conductivity in aqueous electrolyte than organic electrolytes; the conductivities of the bulk electrolytes used here were measured to be 65 mS $cm^{-1}$ and 7.5 mS $cm^{-1}$ for the aqueous and organic electrolytes respectively.

In contrast, the "Nafion®/PVDF" control membrane had 40 times higher conductivity in water than in DMC. For the Neon® 117" control membrane, which had the most significant difference in uptake between the two solvents, conductivity increased by a factor of 1400 when the solvent was changed from DMC to water. As such, the "Nafion® 117" control membrane had both the highest conductivity in aqueous electrolyte and the lowest conductivity in DMC electrolyte.

These differences in conductivity largely follow the trends of solvent uptake, i.e. the membranes with the greatest solvent uptake have the greatest conductivity, with a few exceptions. First, the "Nafion®/PVDF" control membrane had a slightly higher conductivity in aqueous electrolyte than the POATS-PPO membranes for the same water uptake, and a similar conductivity in organic electrolyte with lower organic electrolyte uptake. Second, the POATS-PPO-4.6 and POATS-PPO-6.3 membranes had an approximately twofold different conductivity in the organic electrolyte (0.015 mS $cm^{-1}$ and 0.032 mS $cm^{-1}$) despite a small difference in solvent uptake (30.7% versus 31.7%).

Ferrocene Permeability

Figure 4:
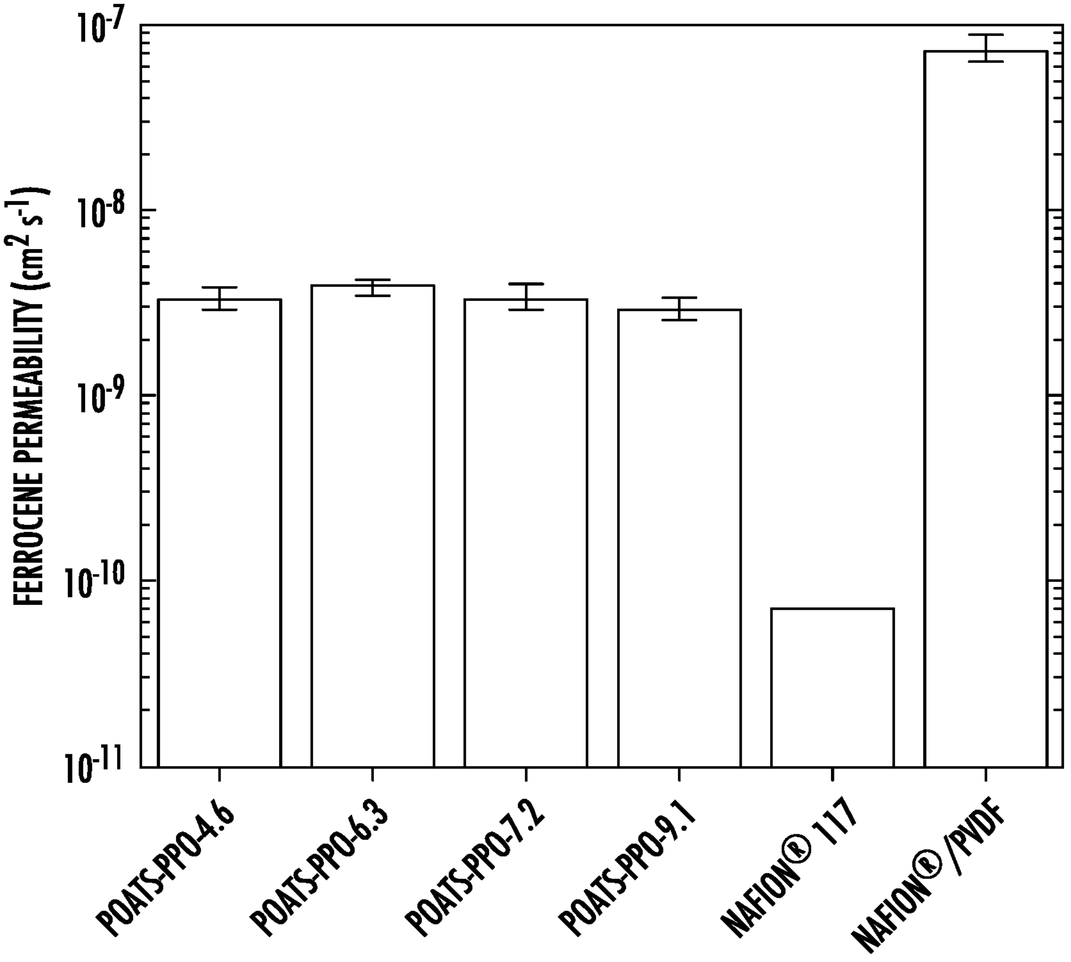
FIG. 4 is a graph showing the ferrocene permeability (measured in square centimeters per second ($cm^2$ $s^{-1}$) for the membranes described for FIGS. 2A and 2B. Permeability was measured using 1 molar (M) lithium bis(fluorosulfony) imide (LiFSI) in dimethyl carbonate (DMC) as the electrolyte. Ferrocene permeation through the "Nafion® 117" control membrane was not detectable over the timescale of the measurement, thus the value reported was the upper limit. Data are reported as the average of three measurements. The uncertainty was taken as one standard deviation from the mean of the three measurements.

Ferrocene was chosen as an exemplary redox active molecule in the presently disclosed studies because it has been used in RFBs previously[12,20] and has been used as a probe to test membrane crossover.[16,44] Due to the insolubility of ferrocene in water, ferrocene permeability was only characterized using the organic electrolyte. See FIG. 4. The ferrocene permeability did not change significantly with increasing IEC of the POATS-PPO membranes. It was reasonable that the IEC of the polymer would not dramatically influence ferrocene permeability due to the molecule being uncharged. The IEC, however, does influence swelling, so ferrocene permeability appeared to also be minimally affected by swelling differences.

The range of the measured ferrocene permeability values, among the POATS-PPO membranes and the control membranes, was much larger than that of the ionic conductivities.

While ionic conductivity in DMC varied by less than an order of magnitude across all of the membranes, ferrocene permeability varied by at least three orders of magnitude. The crossover rate in the "Nation® 117" control membrane was too low to be measured; the ferrocene concentrations remained below the UV-Vis spectroscopy detection limit over the timeframe of the experiment, and thus, an upper limiting value was reported. Ferrocene crossover rates in this control membrane have been reported for other carbonate based electrolytes. In 1 M $LiPF_6$ in propylene carbonate, for example, the crossover rate was reported as $8.8\times10^{-10}$ $cm^2\ s^{-1}$.[16] Without being bound to any one theory, the lower solvent uptake of the control membranes in DMC electrolyte compared to the reported value for this propylene carbonate electrolyte, 11% compared to around 40%,[16] is believed to contribute to the lower observed crossover rate.

The chemical composition and morphology of the control membranes can also have contributed to the relatively low crossover rate. The morphological structure of NAFION® polymers has been described as nano-phase separated hydrophilic and hydrophobic domains.[45] It is believed that the uncharged and non-polar ferrocene molecule can interact more favorably with the hydrophobic domains. NAFION® polymers, however, are perfluorinated, and hydrogenated molecules are often excluded from perfluorinated polymers to a greater extent than from hydrogenated polymers.[46] Therefore, without being bound to any one theory, it is believed that ferrocene can experience unfavorable interactions with both the hydrophilic and hydrophobic domains of NAFION® polymer-based membranes, which can explain the reduced ferrocene permeability relative to that observed in the hydrogenated materials.

The "Nafion®/PVDF" control membrane, however, had a much higher crossover rate than the POATS-PPO membranes. This result was consistent with the above speculation. For instance, introducing PVDF, a partially hydrogenated polymer, to the membrane yielded an increase in ferrocene permeability, possibly due in part to stronger interactions between ferrocene and the polymer. PVDF also has a low glass transition temperature, −35° C., which can further drive an increase in ferrocene permeability.[47] In contrast, the POATS-PPO membranes have a hydrogenated, aromatic backbone, which is chemically similar to the aromatic groups of ferrocene, and this chemical similarity can cause the ferrocene permeability to be higher in POATS-PPO compared to the "Nation® 117" control membrane.

The permeability of the redox active molecule can affect the coulombic efficiency, as well as the lifetime of the electrolyte before the concentration of the redox active molecule drops too low, due to crossover, to efficiently charge/discharge the battery.[14] The coulombic efficiency along with the voltage efficiency, which results largely from the membrane conductance, determine the energy efficiency of the battery.[3] To raise both voltage and coulombic efficiency simultaneously, the selectivity, i.e., the ratio of conductivity to active species permeability ideally can be increased. However, the selectivity should be considered in combination with conductivity because although a high selectivity and low conductivity membrane has the potential to achieve high voltage and coulombic efficiency, these performance properties are realized at low current densities.[48]

Figure 5:
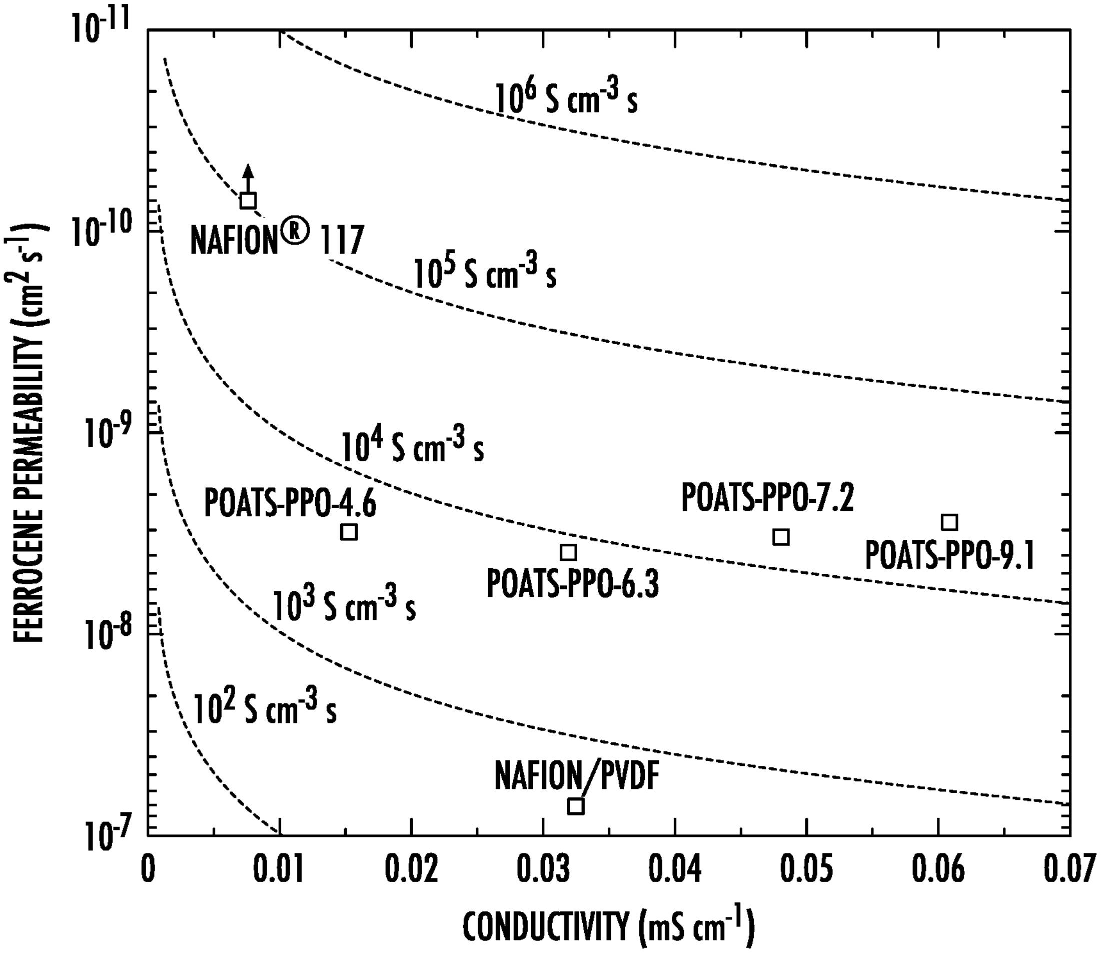
FIG. 5 is a graph showing the ferrocene permeability (measured in square centimeters per second ($cm^2$ $s^{-1}$)) and membrane ionic conductivity (measured in millisiemens per centimeter (mS $cm^{-1}$)) tradeoff plot for the membranes describe in FIGS. 2A and 2B. Note that the y-axis has been inverted such that permeability decreases (favorable for flow battery applications) in the upward direction. The dashed lines represent different selectivity values, as labeled. Data points on lines closer to the top right corner have a more favorable ratio of ionic conductivity and ferrocene permeability for redox flow batteries (RFBs).

The relationship between membrane conductivity and permeability for the materials used in the present studies are shown in FIG. 5, and lines of constant selectivity are provided to aid comparison. The non-blended "Nation® 117" control membrane had the highest selectivity but the lowest conductivity. In contrast, the control membrane based on the PVDF blend had the lowest selectivity of the tested membranes in this system. All of the POATS-PPO membranes considered had similar ferrocene permeability, and thus, selectivity increased modestly with increasing IEC to a maximum of $2.1\times10^4$ S $cm^{-3}$ s.

Presently, few studies report ferrocene permeability of membranes exposed to organic electrolytes. The values, however, can be compared to selectivity values measured in a different non-aqueous system: vanadium(III) acetylacetonate (as the redox active molecule) and 0.1 M tetrabutylammonium tetrafluoroborate in acetonitrile (as the electrolyte).[13] In this system, a commercial anion exchange membrane sold under the tradename NEOSEPTA AHA (Tokuyama Corporation, Shunan, Japan), intended for aqueous systems, was reported as having a selectivity of $6.7\times10^3$ S $cm^{-3}$ s, a Celgard 2325 nanoporous separator (Celgard LLC, Charlotte, North Carolina, United States of America) was reported as having a selectivity of $8.2\times10^2$ S $cm^{-3}$ s, and a custom aramid nanofiber membrane was reported as having a selectivity of $1.2\times10^3$ S $cm^{-3}$ s.

Non-aqueous RFBs, in general, have not been studied and developed as extensively as aqueous RFBs. As such, few studies exist on membrane materials designed explicitly with the goal of targeting the multidimensional problems of non-aqueous membranes, namely long-term stability in organic electrolyte solutions/solvents, high ionic conductivity for the charge carriers necessary to operate the battery, and limited permeability of the redox active molecules necessary for electrochemical charge/discharge. The presently disclosed modified PPO membranes represent one of the few materials explicitly synthesized and characterized towards these often competing material objectives.

Summary of Discussion

The vast majority of membrane research has focused on aqueous systems, and thus, ion exchange membranes for non-aqueous systems stand to benefit considerably from continued exploration and optimization of chemistry and processing. Commonly used membranes in aqueous systems do not necessarily maintain their performance and material properties in non-aqueous systems, as suggested by the relative conductivities of NAFION®-based membranes and POATS-PPO-9 in water and DMC. The comparison of the ionic conductivities of the POATS-PPO membranes and NAFION®-based membranes in aqueous and non-aqueous systems revealed solvent-dependent properties different from that suggested by the intrinsic electrolyte solution conductivities. This result indicated that polymer design strategies for aqueous systems do not scale and transfer to non-aqueous systems in a predictable manner, and improvements in non-aqueous membrane performance can, in some cases, be achieved by modifying the polymer in a manner that would decrease conductivity measured using an aqueous electrolyte. The POATS-PPO membranes considered in the presently disclosed studies achieved an ionic conductivity of up to 0.061 mS $cm^{-1}$, higher than either of the control membrane materials previously used in non-aqueous redox flow battery applications, while maintaining favorable selectivity properties. Thus, the presently disclosed POATS-PPO membranes provide a promising combination of $Li^+$ conductivity and selectivity.

Example 10

Crosslinking

The ion conducting polymers of the presently disclosed subject matter can also be crosslinked as shown in Scheme 1, above. Crosslinking the polymer can reduce the ability of the polymeric membrane to swell and reduce the amount of solvent in the membrane. This, in turn, can lead to lower crossover rates and/or increased mechanical strength of the membranes.

The presently disclosed POATS-PPO membranes were crosslinked by dissolving unreacted Br—PPO in the POATS-PPO solution when the membrane was being cast and heat treating the resulting membrane. Heat-based cross-linking of Br—PPOs has been reported previously under various conditions.[49-51] For the presently disclosed studies, in a typical crosslinking treatment, after the membrane was dried and ion exchanged to the lithium counter-ion form, it was heated to about 150° C. for 16 hours.

Figure 8:
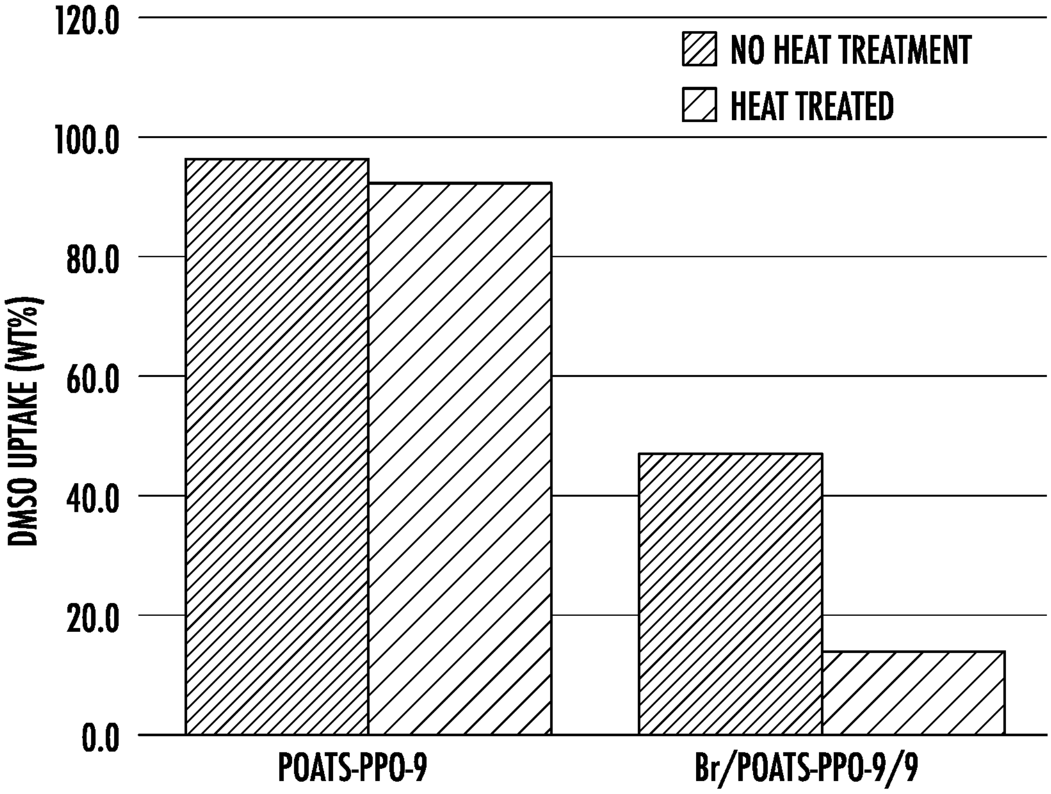
FIG. 8 is a graph showing the dimethyl sulfoxide (DMSO) uptake of non-crosslinked and crosslinked membranes. Poly (phenylene oxide) (PPO) with about 9 percent (%) of the monomeric units functionalized with phenoxylaniline trisulfonate (POATS) (POATS-PPO-9) did not show a significant change in solvent uptake after heat-treatments, while a blend of 50% by weight of PPO with about 9% brominated monomeric units (Br—PPO-9) and POATS-PPO-9 (Br/POATS-PPO-9/9) showed a significant decreased in solvent uptake after heat treatment, indicating that cross-linking occurred in the blend.

Verification of crosslinking was performed by studying solvent uptake. See FIG. 8. POATS-PPO-9 (PPO with about 9% of monomeric units modified by a POATS side chain) absorbed a large amount of DMSO, nearly doubling in weight. The heat treatment procedure was performed on a pure POATS-PPO-9 membrane, which should have no ability to crosslink. It did not show a significant change in solvent uptake, which suggests that no degradation or other unexpected reactions occurred at those temperatures. Indeed, as noted previously, TGA measurements did not show signs of degradation in the POATS-PPO materials until around 400° C. Next, crosslinking procedure was performed by mixing in about 50% by weight Br—PPO-9 (PPO with about 9% of monomeric units modified by bromine) with the POATS-PPO-9 and a membrane was cast. Solvent uptake was measured before and after the heat treatment. In this case, the heat treatment did result in a significantly decreased solvent uptake, which indicates that the crosslinking reaction successfully took place and is able to restrict the solvent uptake of the membrane. The extent of crosslinking in the membrane can be varied both by changing the mass percent of Br—PPO mixed with the POATS-PPO and by changing the degree of substitution of the Br—PPO. Studies using partially halogenated PPO up to Br—PPO-50 were conducted.

Example 11

PEG-Modified Membranes

The conductivity of membranes to Li-ions can be improved by the integration of ether functional groups.[52] These groups can coordinate with the lithium ions in solution and improve their conduction through the membrane. These ether groups are most often in the form of polyethylene oxide (PEO). However, simply blending PEO into the presently disclosed membranes could result in increased crossover rates due to high swelling and the amorphous nature of PEO. To mitigate this effect, PEO was integrated as part of a PPO side chain in the form of short oligomers, typically referred to as polyethylene glycol (PEG) instead of PEO. This modification is done using a Williamson ether synthesis reaction[53], in which an alkyl halide and alkyl hydroxide condense to form an ether in the presence of a strong base and an anhydrous, aprotic solvent. For example, as shown below in Scheme 5, Br—PPO was modified with polyethylene glycol phenyl ether (PEGPE) using potassium hydroxide in tetrahydrofuran (THF). This reaction procedure can be done using PEG based side chains of different lengths, and well as with side chains that contain charged groups.

Scheme 5. PEG modified membrane reaction mechanism.

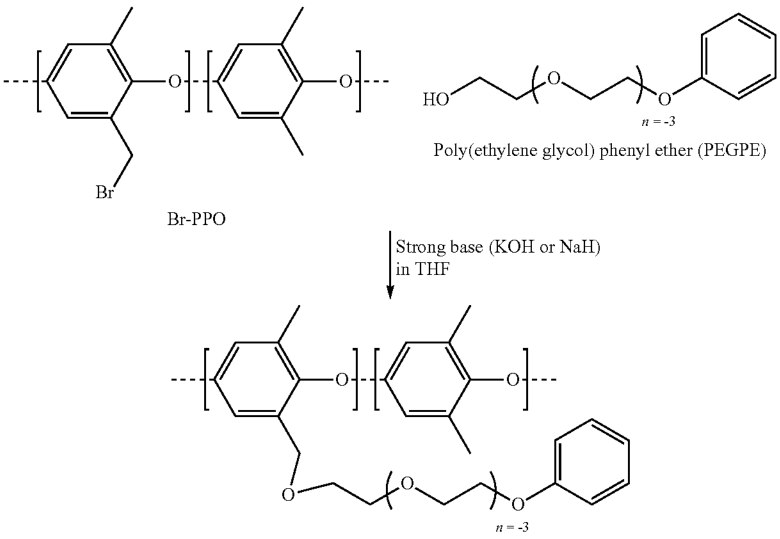

Br-PPO

Poly(ethylene glycol) phenyl ether (PEGPE)

PEGPE-PPO

Figure 9:
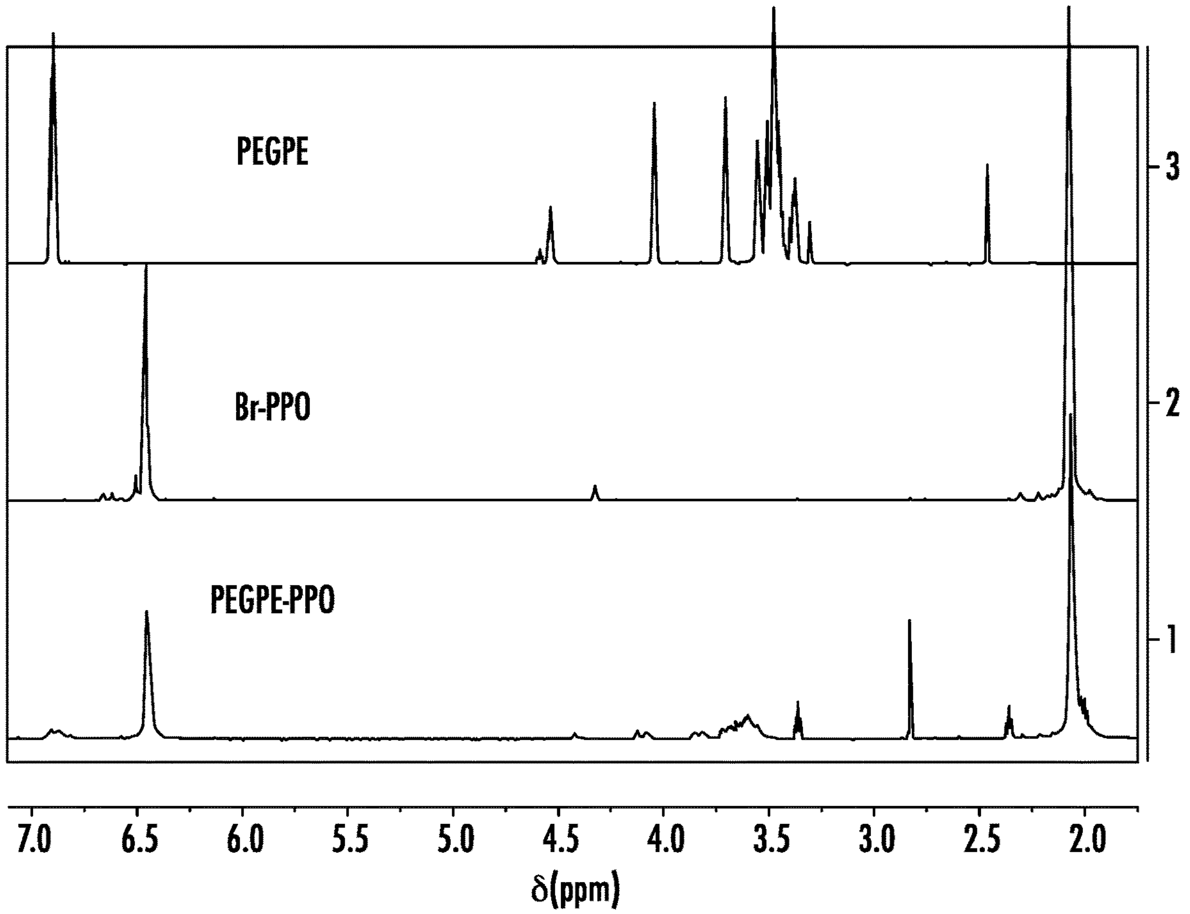
FIG. 9 is a graph showing the nuclear magnetic resonance (NMR) spectra of (top) polyethylene glycol phenyl ether (PEGPE); (middle) brominated poly(phenylene oxide) (Br—PPO), and (bottom) PEGPE-modified poly(phenylene oxide) PEGPE-PPO.

PEGPE-modification of PPO was confirmed to have occurred successfully using NMR. See FIG. 9. The NMR spectrums of PEGPE, Br—PPO, and PEGPE-PPO are shown below. The PEGPE-PPO spectrum shows peaks from both Br—PPO and PEGPE, although the PEGPE signals are weaker due to the relatively small amount of PEGPE compared to PPO. The success of the reaction is seen by the shift of a few peaks. The peak at 4.30 ppm in the Br—PPO spectrum corresponds to the bromo-methyl group, and it shifts to 4.45 ppm after the bromine is replaced with the ether. Several of the peaks in the PEGPE spectrum in the 3-4 ppm range also shift after the hydroxide group is replaced with a benzyl ether group.

REFERENCES

All references listed in the instant disclosure, including but not limited to all patents, patent applications and publications thereof, scientific journal articles, and database entries are incorporated herein by reference in their entireties to the extent that they supplement, explain, provide a background for, and/or teach methodology, techniques, and/or compositions employed herein. The discussion of the references is intended merely to summarize the assertions made by their authors. No admission is made that any reference (or a portion of any reference) is relevant prior art. Applicants reserve the right to challenge the accuracy and pertinence of any cited reference.

1. P. Alotto, M. Guarnieri, F. Moro, Redox flow batteries for the storage of renewable energy: A review, Renew. Sustain. Energy Rev. 29 (2014) 325-335. https://doi.org/10.1016/irser.2013.08.001.
2. M. L. Perry, A. Z. Weber, Advanced Redox-Flow Batteries: A Perspective, J. Electrochem. Soc. 163 (2016) A5064-A5067. https://doi.org/10.1149/2.0101601jes.
3. A. Z. Weber, M. M. Mench, J. P. Meyers, P. N. Ross, J. T. Gostick, Q. Liu, Redox flow batteries: A review, J. Appl. Electrochem. 41 (2011) 1137-1164. https://doi.org/10.1007/s10800-011-0348-2.
4. K. Gong, Q. Fang, S. Gu, S. F. Y. Li, Y. Yan, Nonaqueous redox-flow batteries: organic solvents, supporting electrolytes, and redox pairs, Energy Environ. Sci. 8 (2015) 3515-3530. https://doi.org/10.1039/$C_5$EE02341F.
5. X. Wei, W. Pan, W. Duan, A. Hollas, Z. Yang, B. Li, Z. Nie, J. Liu, D. Reed, W. Wang, V. Sprenkle, Materials and Systems for Organic Redox Flow Batteries: Status and Challenges, ACS Energy Lett. 2 (2017) 2187-2204. https://doi.org/10.1021/acsenergylett.7b00650.
6. W. Wang, Q. Luo, B. Li, X. Wei, L. Li, Z. Yang, Recent progress in redox flow battery research and development, Adv. Funct. Mater. 23 (2013) 970-986. https://doi.org/10.1002/adfm.201200694.
7. Z. Qi, G. M. Koenig, Z. Qi, G. M. Koenig, Review Article: Flow battery systems with solid electroactive materials Review Article: Flow battery systems with solid electroactive materials, 040801 (2018). https://doi.org/10.1116/1.4983210.
8. F. R. Brushett, J. T. Vaughey, A. N. Jansen, An all-organic non-aqueous lithium-ion redox flow battery, Adv. Energy Mater. 2 (2012) 1390-1396. https://doi.org/10.1002/aenm.201200322.
9. X. Wei, W. Xu, M. Vijayakumar, L. Cosimbescu, T. Liu, TEMPO-Based Catholyte for High-Energy Density Nonaqueous Redox Flow Batteries, Adv. Mater. 26 (2014) 7649-7653. https://doi.org/10.1002/adma.201403746.
10. G. Cong, Y. Zhao, Z. Li, Y. Lu, A Highly Concentrated Catholyte Enabled by a Low-Melting-Point Ferrocene Derivative, ACS Energy Lett. 2 (2017) 869-875. https://doi.org/10.1021/acsenergylett.7b00115.
11. S. E. Doris, A. L. Ward, A. Baskin, P. D. Frischmann, N. Gavvalapalli, E. Chénard, C. S. Sevov, D. Prendergast, J. S. Moore, B. A. Helms, Macromolecular Design Strategies for Preventing Active-Material Crossover in Non-Aqueous All-Organic Redox-Flow Batteries, Angew. Chemie—Int. Ed. 56 (2017) 1595-1599. https://doi.org/10.1002/anie.201610582.
12. B. Hwang, M. Park, K. Kim, Ferrocene and Cobaltocene Derivatives for Non-Aqueous Redox Flow Batteries, ChemSusChem. 8 (2015) 310-314. https://doi.org/10.1002/cssc.201403021.
13. S. Tung, S. L. Fisher, N. A. Kotov, L. T. Thompson, Nanoporous aramid nanofibre separators for nonaqueous redox flow batteries, Nat. Commun. (2018). https://doi.org/10.1038/s41467-018-05752-x.
14. E. C. Montoto, G. Nagarjuna, J. S. Moore, Redox Active Polymers for Non-Aqueous Redox Flow Batteries: Validation of the Size-Exclusion Approach, J. Electrochem. Soc. 164 (2017) 1688-1694. https://doi.org/10.1149/2.1511707jes.
15. M. Doyle, M. E. Lewittes, M. G. Roelofs, S. A. Perusich, R. E. Lowrey, Relationship between ionic conductivity of perfluorinated ionomeric membranes and nonaqueous solvent properties, J. Memb. Sci. 184 (2001) 257-273. https://doi.org/10.1016/S0376-7388(00)00642-6.
16. L. Su, R. M. Darling, K. G. Gallagher, W. Xie, J. L. Thelen, A. F. Badel, J. L. Barton, K. J. Cheng, N. P. Balsara, J. S. Moore, F. R. Brushett, An Investigation of the Ionic Conductivity and Species Crossover of Lithiated Nafion 117 in Nonaqueous Electrolytes, J. Electrochem. Soc. 163 (2016) A5253-A5262. https://doi.org/10.1149/2.03211601jes.
17. N. S. Hudak, L. J. Small, H. D. Pratt, T. M. Anderson, Through-Plane Conductivities of Membranes for Nonaqueous Redox Flow Batteries, J. Electrochem. Soc. 162 (2015) A2188-A2194. https://doi.org/10.1149/2.0901510jes.
18. Z. Qi, G. M. K. Jr, A carbon-free lithium-ion solid dispersion redox couple with low viscosity for redox flow batteries, J. Power Sources. 323 (2016) 97-106. https://doi.org/10.1016/j.jpowsour.2016.05.033.
19. S. Wu, Y. Zhao, D. Li, Y. Xia, S. Si, An asymmetric Zn//Ag doped polyaniline microparticle suspension flow battery with high discharge capacity, J. Power Sources. 275 (2015) 305-311. https://doi.org/10.1016/j.jpowsour.2014.11.012.
20. C. Jia, F. Pan, Y. G. Zhu, Q. Huang, L. Lu, Q. Wang, High-energy density nonaqueous all redox flow lithium battery enabled with a polymeric membrane, Sci. Adv. 1 (2015) 1-7. https://doi.org/10.1126/sciadv.1500886.
21. S. Yang, C. Gong, R. Guan, H. Zou, H. Dai, Sulfonated poly(phenylene oxide) membranes as promising materials for new proton exchange membranes, Polym. Adv. Technol. 17 (2006) 360-365. https://doi.org/10.1002/pat.718.
22. N. Li, T. Yan, Z. Li, T. Thurn-Albrecht, W. H. Binder, Comb-shaped polymers to enhance hydroxide transport in anion exchange membranes, Energy Environ. Sci. 5 (2012) 7888-7892. https://doi.org/10.1039/c2ee22050d.
23. S. S. Mahajan, Structural modification of poly(2,6-dimethyl-1,4-phenylene oxide), Polym. Plast. Technol. Eng. 30 (1991) 27-36. https://doi.org/10.1080/03602559108019203.
24. T. Xu, D. Wu, L. Wu, Poly(2,6-dimethyl-1,4-phenylene oxide) (PPO)-A versatile starting polymer for proton conductive membranes (PCMs), Prog. Polym. Sci. 33 (2008) 894-915. https://doi.org/10.1016/j.progpolymsci.2008.07.002.
25. C. G. Cho, H. Y. Jong, Y. G. You, G. H. Li, S. G. An, Preparation of poly(phenylene oxide-g-styrenesulfonic acid) and their characterization for DMFC membrane, High Perform. Polym. 18 (2006) 579-591. https://doi.org/10.1177/0954008306068118.
26. Y. Li, J. Sniekers, J. C. Malaquias, C. Van Goethem, K. Binnemans, J. Fransaer, I. F. J. Vankelecom, Crosslinked anion exchange membranes prepared from poly(phenylene oxide) (PPO) for non-aqueous redox flow batteries, J. Power Sources. 378 (2018) 338-344. https://doi.org/10.1016/j.jpowsour.2017.12.049.

27. B. Lafitte, P. Jannasch, Proton-conducting aromatic polymers carrying hypersulfonated side chains for fuel cell applications, Adv. Funct. Mater. 17 (2007) 2823-2834. https://doi.org/10.1002/adfm.200700107.
28. Z. Du, D. L. Wood, I. Belharouak, Enabling fast charging of high energy density Li-ion cells with high lithium ion transport electrolytes, Electrochem. Commun. 103 (2019) 109-113. https://doi.org/10.1016/j.elecom.2019.04.013.
29. H. B. Han, S. S. Zhou, D. J. Zhang, S. W. Feng, L. F. Li, K. Liu, W. F. Feng, J. Nie, H. Li, X. J. Huang, M. Armand, Z. Bin Zhou, Lithium bis(fluorosulfonyl)imide (LiFSI) as conducting salt for nonaqueous liquid electrolytes for lithium-ion batteries: Physicochemical and electrochemical properties, J. Power Sources. 196 (2011) 3623-3632. https://doi.org/10.1016/j.jpowsour.2010.12.040.
30. M. S. Ding, K. Xu, T. R. Jow, Liquid-Solid Phase Diagrams of Binary Carbonates for Lithium Batteries, J. Electrochem. Soc. 147 (2000) 1688-1694.
31. L. Li, S. Zhou, H. Han, H. Li, J. Nie, M. Armand, Z. Zhou, X. Huang, Transport and electrochemical properties and spectral features of non-aqueous electrolytes containing LiFSI in linear carbonate solvents, J. Electrochem. Soc. 158 (2011) 74-82. https://doi.org/10.1149/1.3514705.
32. J. Fang, X. Guo, S. Harada, T. Watari, K. Tanaka, H. Kita, K. ichi Okamoto, Novel sulfonated polyimides as polyelectrolytes for fuel cell application: 1. Synthesis, proton conductivity, and water stability of polyimides from 4,4'-diaminodiphenyl ether-2,2'-disulfonic acid, Macromolecules. 35 (2002) 9022-9028. https://doi.org/10.1021/ma020005b.
33. Chemours, Nafion NR211 and NR212, (n.d.). https://nafionstore-us.americommerce.com/Shared/P11_C10610_Nafion_NR-211_NR-212_P11.pdf.
34. Dupont, DuPont Nation® PFSA Membranes, (n.d.) 0-3. http://www.nafionstore.com/SharedBulletins/N115-N117-N1110.pdf.
35. A. R. Khodabakhshi, S. S. Madaeni, T. W. Xu, L. Wu, C. Wu, C. Li, W. Na, S. A. Zolanvari, A. Babayi, J. Ghasemi, S. M. Hosseini, A. Khaledi, Preparation, optimization and characterization of novel ion exchange membranes by blending of chemically modified PVDF and SPPO, Sep. Purif. Technol. 90 (2012) 10-21. https://doi.org/10.1016/j.seppur.2012.02.006.
36. G. M. Geise, L. P. Falcon, B. D. Freeman, D. R. Paul, Sodium chloride sorption in sulfonated polymers for membrane applications, J. Memb. Sci. 423-424 (2012) 195-208. https://doi.org/10.10161.memsci.2012.08.014.
37. P. Marchetti, M. F. J. Solomon, G. Szekely, A. G. Livingston, Molecular Separation with Organic Solvent Nanofiltration: A Critical Review, Chem. Rev. 114 (2014) 10735-10806. https://doi.org/10.1021/cr500006j.
38. T.-P Jauhiainen, Effect of bromine and phosphorus substituents on the glass transition properties of some substituted poly(oxy-1,4-phenylenes), Die Angew. Makromol. Chemie. 104 (1982) 117-127. https://doi.org/10.1002/apmc.1982.051040111.
39. Y. S. Bhole, P. B. Karadkar, U.K. Kharul, Nitration and amination of polyphenylene oxide: Synthesis, gas sorption and permeation analysis, Eur. Polym. J. 43 (2007) 1450-1459. https://doi.org/10.1016/j.eurpolymj.2007.01.017.
40. G. M. Geise, D. R. Paul, B. D. Freeman, Fundamental water and salt transport properties of polymeric materials, Prog. Polym. Sci. 39 (2014) 1-42. https://doi.org/10.1016/j.progpolymsci.2013.07.001.
41. K. D. Kreuer, On the development of proton conducting polymer membranes for hydrogen and methanol fuel cells, 185 (2001) 29-39.
42. H. Zhang, C. Li, M. Piszcz, E. Coya, T. Rojo, L. M. Rodriguez-Martinez, M. Armand, Z. Zhou, Single lithium-ion conducting solid polymer electrolytes: Advances and perspectives, Chem. Soc. Rev. 46 (2017) 797-815. https://doi.org/10.1039/c6cs00491a.
43. Q. Ma, H. Zhang, C. Zhou, L. Zheng, P. Cheng, J. Nie, W. Feng, Y. Hu, H. Li, X. Huang, L. Chen, M. Armand, Single Lithium-Ion Conducting Polymer Electrolytes Based on a Super-Delocalized Polyanion, Angew. Chemie—Int. Ed. 55 (2016) 2521-2525. https://doi.org/10.1002/anie.201509299.
44. L. Yang, J. Zeng, B. Ding, C. Xu, J. Y. Lee, Lithium Salt Inclusion as a Strategy for Improving the Li+ Conductivity of Nafion Membranes in Aprotic Systems, Adv. Mater. Interfaces. 3 (2016) 1-8. https://doi.org/10.1002/admi.201600660.
45. K. D. Kreuer, On the development of proton conducting polymer membranes for hydrogen and methanol fuel cells, J. Memb. Sci. 185 (2001) 29-39.
46. F. Petit, I. Iliopoulos, R. Audebert, S. Szo, Associating Polyelectrolytes with Perfluoroalkyl Side Chains: Aggregation in Aqueous Solution, Association with Surfactants, and Comparison with Hydrogenated Analogues, Langmuir. 7463 (1997) 4229-4233. https://doi.org/10.1021/Ia970003y.
47. S. C. George, S. Thomas, Transport phenomena through polymeric systems, Prog. Polym. Sci. 26 (2001) 985-1017.
48. R. M. Darling, K. G. Gallagher, J. A. Kowalski, S. Ha, F. R. Brushett, Pathways to low-cost electrochemical energy storage: a comparison of aqueous and nonaqueous flow batteries, Energy Environ. Sci. 7 (2014) 3459-3477. https://doi.org/10.1039/$C_4$EE02158D.
49. Zhang, G., Li, H., Ma, W., Zhang, L., Lew, C. M., Xu, D., Han, M., Zhang, Y., Wu, J., and Na, H. "Cross-Linked Membranes with a Macromolecular Cross-Linker for Direct Methanol Fuel Cells" Journal ofMaterials Chemistry 21, no. 14 (2011).
50. Wu, D., Fu, R., Xu, T., Wu, L., and Yang, W. "A Novel Proton-Conductive Membrane with Reduced Methanol Permeability Prepared from Bromomethylated Poly(2,6-Dimethyl-1,4-Phenylene Oxide) (BPPO)" Journal of Membrcme Science 310, no. 1-2 (2008).
51. L. Liu, Q. Li, J. Dai, H. Wang, B. Jin, R. Bai, "A facile strategy for the synthesis of guanidinium-functionalized polymer as alkaline anion exchange membrane with improved alkaline stability", Journal of Membrane Science 453 (2014).
52. Z. Xue, D. He, X. Xie, "Poly(ethylene oxide)-based electrolytes for lithium-ion batteries", Journal of Materials Chemistry 3 (2015).
53. G. Lu, H. Liu, H. Gao, C. Feng, Y. Li, X. Huang, "Construction of semi-fluorinated amphiphilic graft copolymer bearing a poly(2-methyl-1,4-bistrifluorovinyloxybenzene) backbone and poly(ethylene glycol) side chains via the grafting-onto strategy", RSC Adv. 5 (2015).

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. An ion conducting polymer comprising a modified poly(phenylene oxide) (PPO), wherein the modified PPO comprises a PPO wherein a portion of monomeric units of the PPO are covalently attached to a sulfonate-substituted arylamino group.

2. The ion conducting polymer of claim 1, wherein the sulfonate-substituted arylamino group is a monovalent moiety of a sulfonate-substituted phenoxyaniline, optionally phenoxyaniline trisulfonate (POATS).

3. The ion conducting polymer of claim 1 or claim 2, wherein up to about 50% of the monomeric units of the PPO are covalently attached to a sulfonate-substituted arylamino group; optionally wherein about 2% to about 30% of the monomeric units of the PPO are covalently attached to a sulfonated-substituted arylamino group.

4. The ion conducting polymer of claim 1, wherein the modified PPO has a structure of Formula (I) or Formula (II):

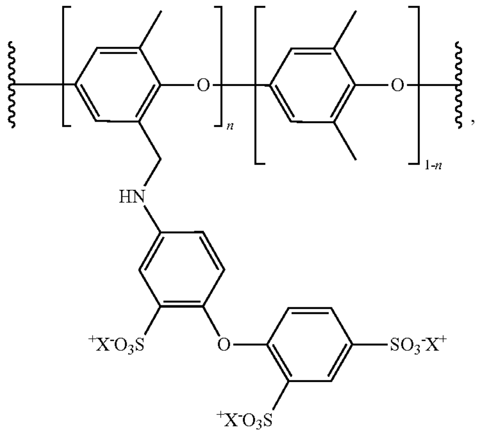

or

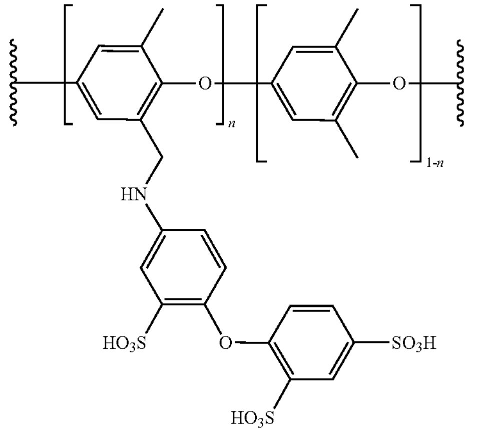

wherein:

$0.025 \leq n \leq 0.091$; optionally wherein $0.046 \leq n \leq 0.091$; and $X^+$ is a cation, optionally an ammonium cation or an alkali metal cation; further optionally $Li^+$.

5. The ion conducting polymer of claim 4, wherein n is selected from 0.0046, 0.0063, 0.0072, and 0.0091.

6. The ion conducting polymer of claim 1, wherein a portion of the monomeric units of the PPO are covalently attached to a side chain comprising an oligomeric polyether, optionally an oligomeric poly(ethylene glycol).

7. A polymer blend comprising two or more polymers, wherein one of the two or more polymers is an ion conducting polymer of claim 1, optionally wherein the mixture comprises at least one polyether-modified PPO, wherein the polyether-modified PPO comprises a PPO wherein a portion of monomeric units of the PPO are covalently attached to a side chain comprising an oligomeric polyether.

8. An ion exchange membrane (IEM) comprising, consisting essentially of, or consisting of an ion conducting polymer of claim 1 or a polymer blend of claim 7.

9. The IEM of claim 8, wherein the ion conducting polymer is crosslinked.

10. The IEM of claim 8, wherein the IEM has a thickness of about 10 nanometers (nm) to about 100 micrometers (μm), optionally about 40 μm to about 100 μm.

11. A battery, fuel cell, or separation device comprising the IEM of claim 8.

12. A battery comprising the IEM of claim 8, wherein the battery is an aqueous or non-aqueous redox flow battery and wherein the battery comprises, in addition to the IEM:

a positive electrode;

a positive electrolyte comprising a first redox active composition, wherein said positive electrolyte is in contact with the positive electrode;

a negative electrode; and a negative electrolyte comprising a second redox active composition, wherein said negative electrode is in contact with the negative electrode, and wherein the IEM is interposed between the positive electrode and the negative electrode.

13. The battery of claim 12, further comprising:

a first circulation loop comprising a positive electrolyte storage tank containing the positive electrolyte, piping for transporting the positive electrolyte, a chamber in which the positive electrode is in contact with the positive electrolyte, and a pump to circulate the positive electrolyte through the first circulation loop; and a second circulation loop comprising a negative electrolyte storage tank containing the negative electrolyte, piping for transporting the negative electrolyte, a chamber in which the negative electrode is in contact with the negative electrolyte, and a pump to circulate the negative electrolyte through the circulation loop.

14. The battery of claim 12, wherein the positive electrode and the negative electrode each comprise, consist essentially of, or consist of one of the group consisting of a metal, a carbon material, and an electro-conductive polymer.

15. The battery of claim 12, wherein the battery is a non-aqueous redox flow battery and wherein the positive electrolyte and the negative electrolyte each comprise a solvent selected from the group consisting of acetonitrile, dimethylacetamide, diethyl carbonate, dimethyl carbonate (DMC), γ-butyrolactone (GBL), propylene carbonate (PC), ethylene carbonate (EC), N-methyl-2-pyrrolidone (NMP), fluoroethylene carbonate, N,N-dimethylacetamide, and mixtures thereof.

16. The battery of claim 15, wherein the positive electrolyte and the negative electrolyte each comprise the same solvent, optionally wherein the solvent is DMC.

17. The battery of claim 15, wherein the positive electrolyte and/or the negative electrolyte comprise an electrolyte salt selected from the group consisting of lithium bis(fluorosulfonyl)imide (LiFSI), lithium tetrafluoroborate ($LiBF_4$), lithium hexafluorophosphate ($LiPF_6$), lithium perchlorate ($LiClO_4$), lithium methyltrifluoromethanesulfonate ($CF_3SO_3$), lithium bis(trifluoromethylsulfonyl)imide [$Li(CF_3SO_2)_2N$], tetraethylammonium tetrafluoroborate ($TEABF_4$), tetrabutylammonium tetrafluoroborate ($TBABF_4$), and mixtures thereof.

18. The battery of claim 15, wherein the first and/or second redox active compositions comprise a metallocene, optionally a ferrocene.

19. An energy storage system comprising the battery of claim 12, or a stack comprising a plurality thereof, connected to an electrical grid.

20. A method of storing energy, wherein the method comprises the use of an energy storage system of claim 19.

21. A method of preparing an ion conducting polymer of claim 1, wherein the method comprises:

(a) contacting a polymer comprising or consisting of poly(2,6-dimethyl-1,4-phenylene oxide) with a free radical halogenation reagent, optionally N-bromo-succinimide (NBS), in the presence of a free radical initiator, optionally azobisisobutyronitrile (AIBN), in a first aprotic solvent, optionally chlorobenzene, thereby forming a partially halogenated polymer; and (b) contacting the partially halogenated polymer with a sulfonated aminoarene in the presence of a catalyst, optionally sodium iodide, and a base, optionally potassium carbonate, in a second aprotic solvent, optionally a mixture chlorobenzene and N-methyl-2-pyrrolidone (NMP).

22. The method of claim 21, wherein the sulfonated aminoarene is a sulfonated phenoxyaniline, optionally phenoxyaniline trisulfonate (POATS).

23. The method of claim 21 or claim 22, wherein the sulfonated aminoarene is prepared from an aminoarene by an aromatic sulfonation reaction, wherein the aromatic sulfonation reaction is performed by contacting the aminoarene with sulfuric acid.

24. A method of preparing an ion exchange membrane (IEM), the method comprising:

(a) providing an ion conducting polymer of claim 1;

(b) dissolving the ion conducting polymer in an aprotic solvent, optionally chlorobenzene, N-methyl-2-pyrrolidone (NMP), or a mixture thereof;

(c) pouring the solution into a mold; and (d) drying the solution.

25. The method of claim 24, wherein the method further comprises performing ion exchange to replace a counter-ion present in the ion conducting polymer with a different counter-ion.

26. The method of claim 24 or claim 25, wherein step (b) further comprises dissolving a halogenated PPO or partially halogenated in the aprotic solvent and wherein the method further comprises heating the IEM to prepare a crosslinked IEM, optionally wherein the heating comprises heating the IEM to a temperature of about 120° C. to about 200° C. for about 2 hours to about 24 hours.

27. The method of claim 24, wherein step (b) further comprises dissolving a polyether-modified PPO in the aprotic solvent, wherein the polyether-modified PPO comprises a PPO wherein a portion of monomeric units of the PPO are covalently attached to a side chain comprising an oligomeric polyether.

* * * * *